(12) United States Patent
Kenessey

(10) Patent No.: US 7,757,490 B2
(45) Date of Patent: Jul. 20, 2010

(54) POWER GENERATION FROM SOLAR AND WASTE HEAT

(75) Inventor: Steven Kenessey, Killarney Heights (AU)

(73) Assignee: Morph Pty Limited, North Sydney (AU)

( * ) Notice: Subject to any disclaimer, the term of this patent is extended or adjusted under 35 U.S.C. 154(b) by 452 days.

(21) Appl. No.: 10/565,518

(22) PCT Filed: Jul. 21, 2004

(86) PCT No.: PCT/AU2004/000972

§ 371 (c)(1), (2), (4) Date: Mar. 10, 2006

(87) PCT Pub. No.: WO2005/008065

PCT Pub. Date: Jan. 27, 2005

(65) Prior Publication Data

US 2006/0156725 A1   Jul. 20, 2006

(30) Foreign Application Priority Data

| Jul. 21, 2003 | (AU) | 2003903767 |
|---|---|---|
| Oct. 8, 2003 | (AU) | 2003905500 |
| Feb. 12, 2004 | (AU) | 2004900699 |
| Mar. 18, 2004 | (AU) | 2004901435 |

(51) Int. Cl.
   *F03G 6/00* (2006.01)
(52) U.S. Cl. .................. 60/641.12; 60/641.8; 60/641.15
(58) Field of Classification Search ... 60/641.8–641.15; 290/43, 44, 54, 55

See application file for complete search history.

(56) References Cited

U.S. PATENT DOCUMENTS

| 4,040,566 | A |   | 8/1977 | Chiarelli |  |
|---|---|---|---|---|---|
| 4,122,675 | A |   | 10/1978 | Polyak |  |
| 4,452,046 | A | * | 6/1984 | Valentin | 60/641.11 |
| 4,935,639 | A | * | 6/1990 | Yeh | 290/55 |
| 5,394,016 | A | * | 2/1995 | Hickey | 290/55 |
| 5,395,598 | A |   | 3/1995 | Prueitt |  |
| 6,016,015 | A | * | 1/2000 | Willard, Jr. | 290/55 |
| 6,532,740 | B1 | * | 3/2003 | Sullivan | 60/641.11 |
| 6,772,593 | B2 | * | 8/2004 | Dunn | 60/641.11 |

FOREIGN PATENT DOCUMENTS

| DE | 19821659 A1 | 11/1999 |
|---|---|---|
| DE | 10224849 A1 | 12/2003 |
| FR | 2307982 A | 11/1976 |
| GB | 2081390 A | 2/1982 |
| GB | 2261705 A | 5/1993 |
| WO | WO 0196740 A1 | 12/2001 |

* cited by examiner

*Primary Examiner*—Hoang M Nguyen
(74) *Attorney, Agent, or Firm*—Greenblum & Bernstein, P.L.C.

(57) ABSTRACT

The invention relates to the generation of electricity and the ventilation of urban areas with the use of waste heat from air-conditioning systems, waste organic matter, fuel cells and wind. A first aspect relates to the creation of a column of rising air in a stack to drive electricity-generating turbines. A second aspect relates to the use of wind energy to create a helix shape upward flow of air that may preferably augment the functioning of the first aspect. An advantage of the system is that by transferring waste heat from urban environments above habitable areas the problem of the so-called heat island effect is greatly alleviated.

25 Claims, 13 Drawing Sheets

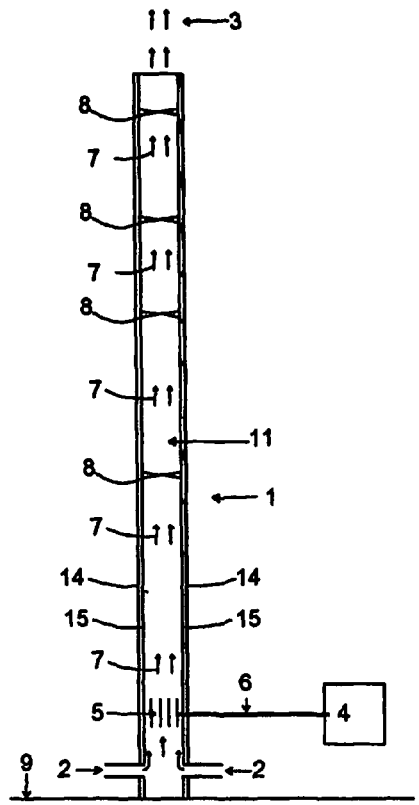
FIGURE 1
FIGURE 2
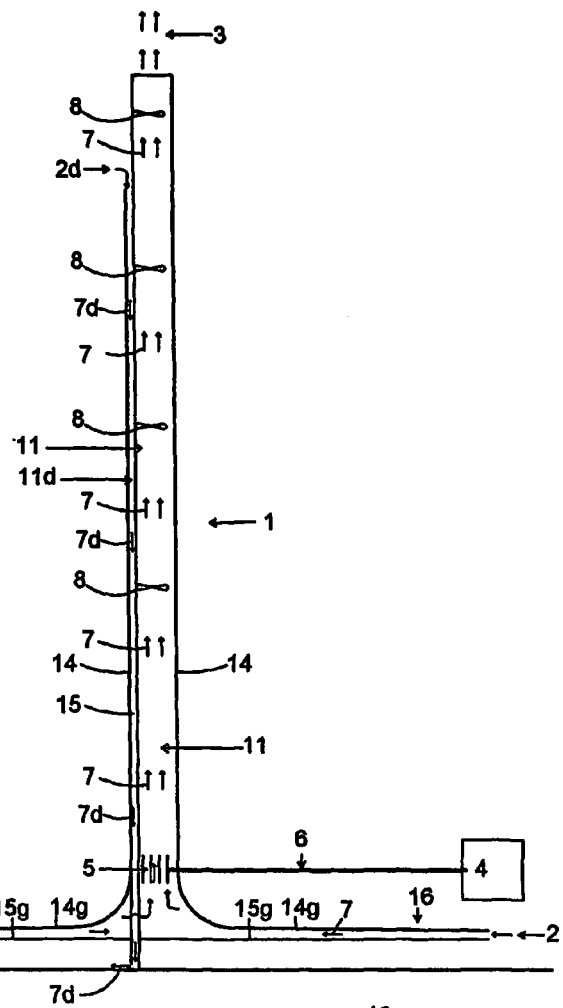
FIGURE 3
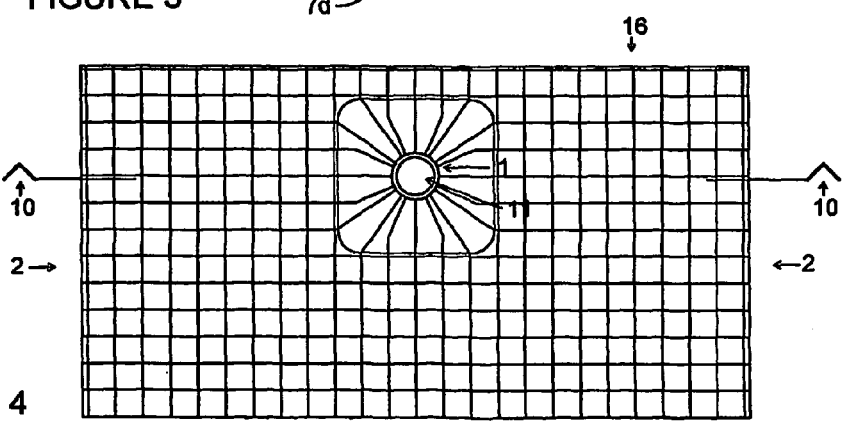
FIGURE 4

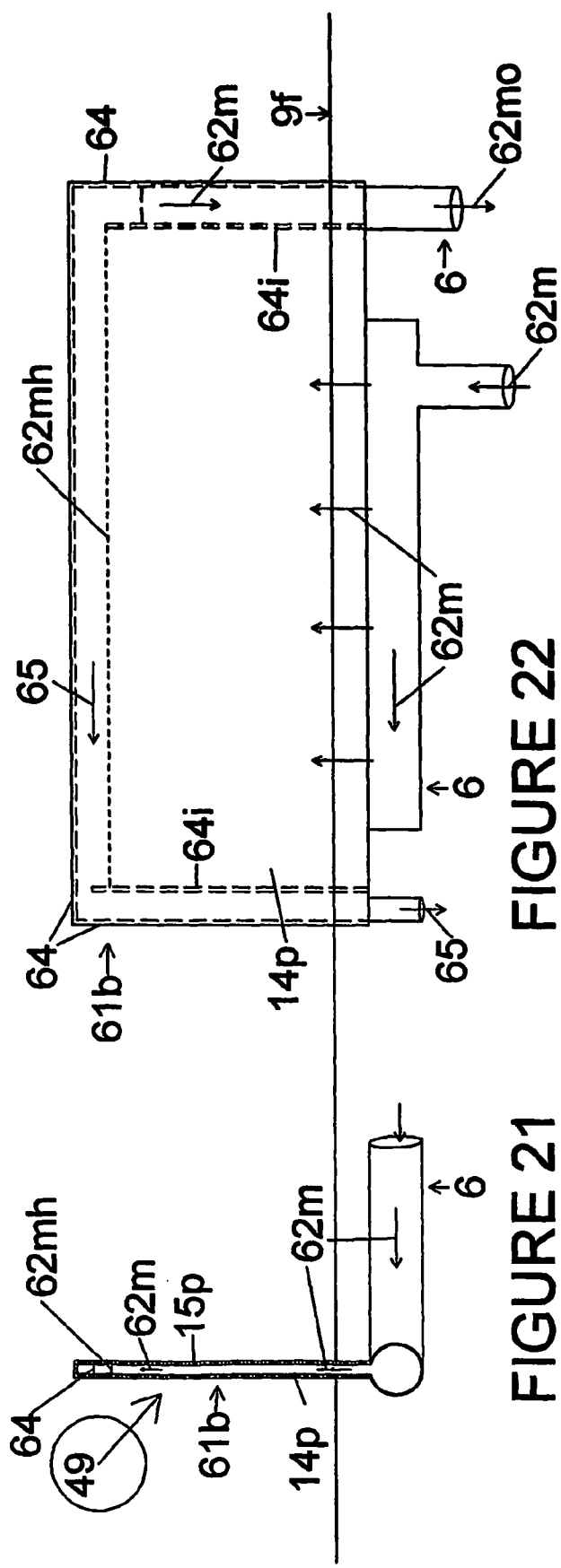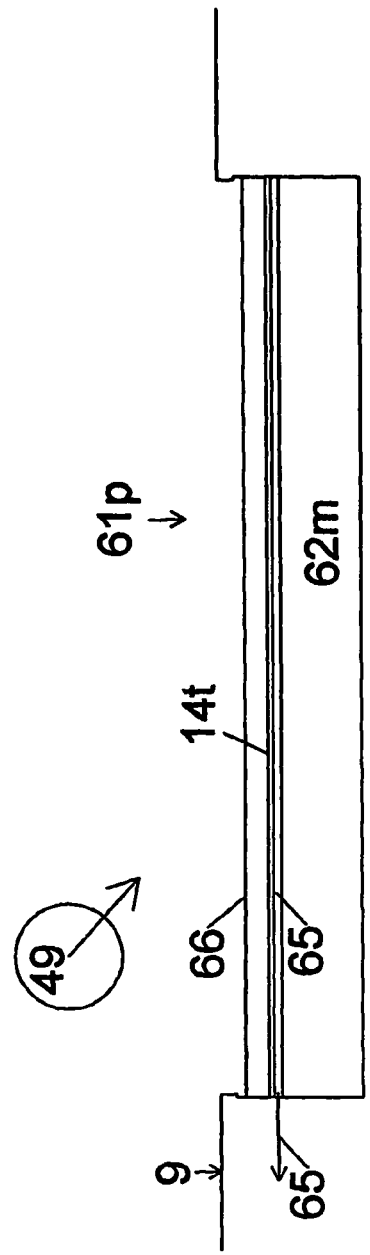

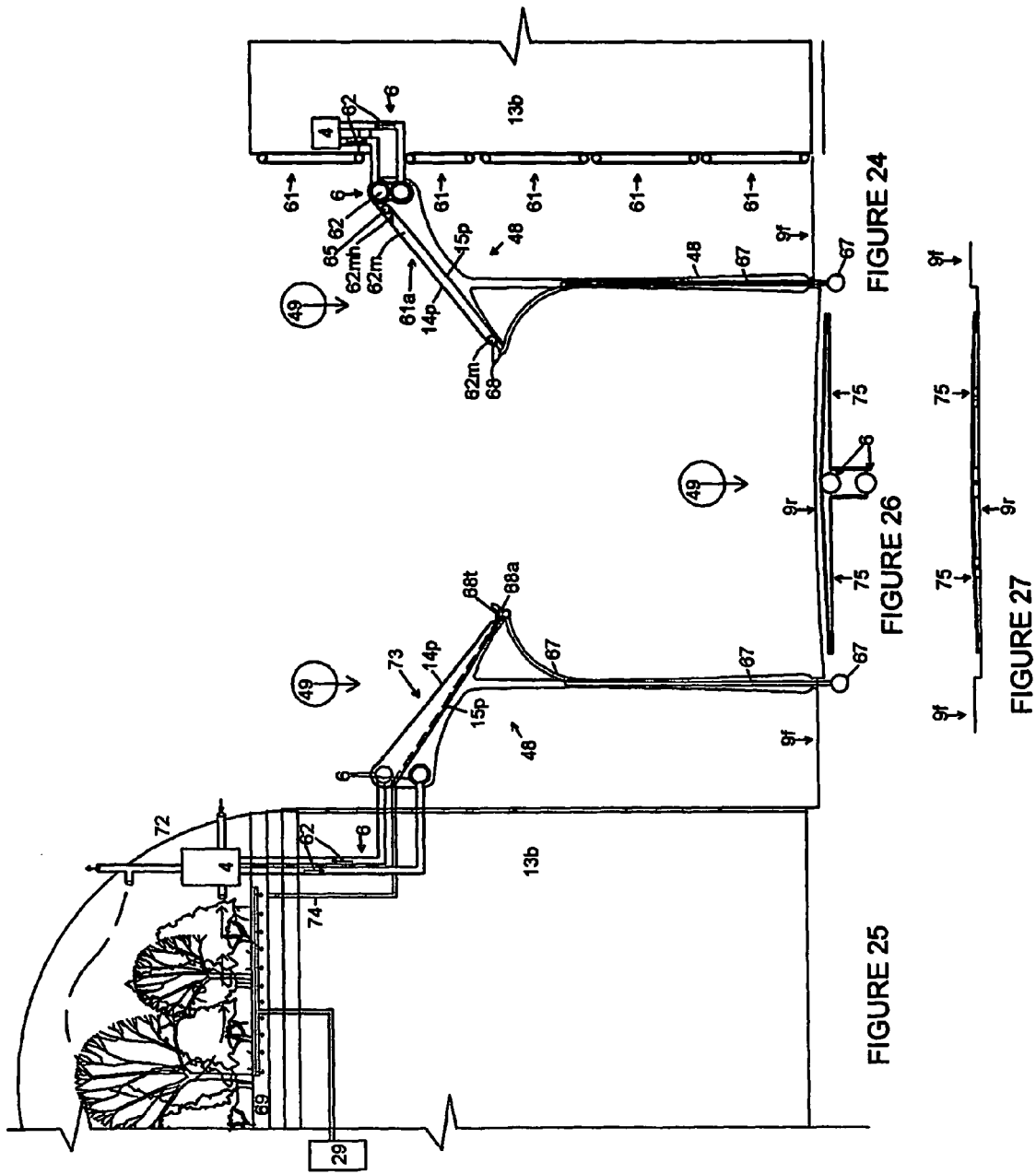

POWER GENERATION FROM SOLAR AND WASTE HEAT

This application is a 371 U.S. national stage application of international application PCT/AU2004/000972 filed Jul. 21, 2004, which claims priority of Australian patent applications 2003903767 filed Jul. 21, 2003; 2003905500 filed Oct. 8, 2003; 2004900699 filed Feb. 12, 2004; and 2004901435 filed Mar. 18, 2004, the disclosures of which are herein incorporated by reference in their entireties.

Solving the problem of global warming is know among the scientific community as well as the community at large one of the major challenges of our time. The use of solar energy to lessen the need for greenhouse gas producing methods of electricity generation is one aspect that is contributing to the solving of this problem.

The problems associated with the higher than normal temperatures afflicting city centres around the world, known as the "heat island effect", largely caused by waste heat from air conditioning systems, is a matter which is in need of urgent attention.

These problems are addressed by the present invention, which provides a novel method of utilizing solar radiation to capture the sun's heat, promote organic life for the production of energy, transfer energy and filter and regulate the amount of solar energy entering man made structures in such a way that the energy filtered in the process may be converted to electricity.

The current invention called in herein called the "Biotower" is normally one or a combination of various aspects with the purpose of creating air movement that can be converted into electricity, as well as, if desired, exhaust polluted air from urban environments and also if desired, purify downward moving air.

The Biotower may preferably be used to exhaust used air and generate electricity from places such as city centres by utilising heat from air conditioning systems in surrounding buildings and/or from the sun's energy and/or by harnessing the energy of the wind.

Aspects of this current invention includes:

the conversion of waste material (mostly sewage and waste paper and other organic waste) into biogas (consisting mostly of methane gas) and into heat and into fertilizer. The heat released by any of these processes may preferably be used to augment the system;

the biogas thus created may then be stored and used to power direct fuel cells, which produces heat and electricity. The heat generated in this process may be used to augment the functioning of the Biotower and the electrical power generated may preferably be used to augment the electrical power output of the Bio Tower's turbine generators as well as provide electrical power when the electrical output of the same turbine generators is low. The said fuel cell may incorporate a turbine generator for the production of additional electricity before the waste heats is used to augment the updraft of air in the tower;

the use of heat generated by the breakdown of sewage and organic matter into fertilizer to augment the biotower system;

the use of impurities extracted from the air for use in sewage converter;

the use of heat from roadways and other heat absorbing surfaces, especially those surfaces that tend to trap and contain the heat of the sun, to augment the functioning of the Biotower;

the use of heat from tunnels especially underground railway tunnels, motor vehicle tunnels and other heat absorbing or generating sources, to augment the functioning of the Bio Tower.

The Biotower may incorporate all methods simultaneously in such a way that they augment each other. Also preferably, when the Biotower system is used in conjunction with a landscaped (flora covered) interior portion of the tower, which is preferably configured in a spiral formation, air may be drawn into the tower by the cooling process associated with the extraction of the heat from the water gathered from the air-conditioning systems (and other heat generating sources) from surrounding buildings, tunnels, road surfaces etc. and, in so doing, the air may be oxygenated and purified and the impurities captured by the process of cooling and the said water may be fed into the landscape and thus filtered. This same process may be cycled two or more times to cool the water to the desired temperature and to augment the downward flow of air. If the system is so configured so as to create low air pressure at the base of the Biotower for use in drawing air down the tower, the aforementioned system, utilizing air temperature differential to cause a downward flow of air down the landscape, may thus be augmented or substituted.

Each of these above aspects preferably may be used together in such a manner so as to augment the functioning of entire system in total. They may also be used as separate systems or in any combination. One aspect of the invention (the heat chimney) utilises the heat exhausted from air conditioning systems, gathered from heat absorbing surfaces, tunnels and other heat sources and uses it to create an updraft of air in the tower, which may be harnessed with the use of electricity-generating turbines either within the tower or or connected to the air intake of the tower supplying the updraft of air within the tower, and/or to the output of the same tower. As well as generating electricity it may also be used to exhaust dirty or used air from urban areas in close proximity to buildings with mechanical air conditioning systems or other heat sources. Also preferably the tower may be incorporated with other functions. For example it may also be use as a look out tower with restaurants and other recreational or tourist facilities. Also the system may preferably be incorporated into the design of an office tower or other building forms.

Preferably this system will be used help to prevent the build up of hot air around major clues (commonly known as the heat island effect) by extracting heat from buildings and other heat sources and releasing the same heat in the said heat chimney and venting it in the upper atmosphere above the city and preferably generate electricity for the city in the same process. The electricity may preferably be connected to the existing electrical power system (commonly known as the power grid).

Another aspect of the invention (the heat trap) relies on the heat of the sun to generate hot air within the tower. It collects the sun's heat by trapping the heat of the suns rays within an air cavity between two layers of glass. The external layer of glass allows the heat from the suns rays to pass through it from the outside to the inside, however it prevents the majority of the same heat from passing back through the same glass from the inside to the outside atmosphere. Once the heat from suns rays pass through the air cavity, the majority of it is prevented from passing through the second layer of glass which reflects the same heat radiation and thus retains the heat within the same air cavity, effectively trapping the heat.

Preferably this same heat trap may be incorporated into the outer façade of the said Biotower, which preferably is configured to incorporate the spiral cavity aspect of this invention and the same heat trap system may also be incorporated into a glass roof structure at the base of the said tower and connected to it in such a way that the heat may flow from the heat trap cavity in the glass roof into the heat trap cavity in the façade of the tower (which may also function as a spiral cavity and thereby augment the system.

Preferably this same heat trap may be incorporated into the outer façade of a preferably tall building and the same heat trap system may also be incorporated into a glass roof structure at the base of the same tower and connected to it in such a way that the heat may flow from the heat trap cavity in the glass roof into the heat trap cavity in the façade of the tower and thereby augment the system. This form of the invention relies on the heat trap cavity around the perimeter of the building to act in a similar way as the said "heat chimney" in that it forms the stack containing the updraft of warm air. It has the additional benefit of allowing light into the building whilst filtering out most of the radiant heat from the sun. This aspect of the invention can be added to existing buildings or incorporated into the design of new buildings and it can be used to augment the ventilation of the building to which it is incorporated with as the updraft within the façade cavity may be accessed from the interior spaces of the same building with vents that promote the functioning of the so called Venturi effect which may be used to draw air from the building into the updraft in the said cavity. If the suction created by this aspect of the invention was used to draw air into the heat trap façade through habitable areas via a cooling area such as a landscaped space or a space filled with air born water such as a waterfall or a fine mist spray, or other cooling and preferably purifying system the said invention may also be used to regulate the air temperature in a building in such a way as to minimize the need for mechanical air conditioning. As the invention may be used to prevent most of the suns radiant heat from entering a building the need for air conditioning to remove the same heat is greatly alleviated. The energy saved by this aspect of the invention can thus be largely conserved for the generation of electricity and a higher proportion of external air may preferably be allowed into habitable parts of the building when the external air temperature is appropriate creating a healthier internal environment.

Preferably this same heat trap may also it may be incorporated into a glass roof structure at the base of the said heat chimney aspect of this invention. The glass roof would be ideal for providing shelter over a large public square as it would allow the sun's light to illuminate the space whilst preventing excessive heat build up as well as making the space usable regardless of weather conditions. The heat trapped within the roof cavity would flow into and augment or completely supply the air rising in the chimney, which would preferably be made of glass, which allows the majority of the sun's radiant heat into the chimney but not out and thus increasing the heat absorbing capacity of the system. Preferably the heat from all available heat sources (such as air conditioning systems, road surface heat, underground tunnel heat etc.) should be released into the same chimney. In this way heat from air conditioning systems, road surfaces and other sources of heat as well as heat directly captured by the invention from the sun is combined within the one chimney to create rising air. This rising air may preferably be utilised to drive generators to generate electricity and extract dirty and polluted air preferably from the street level of the city and from tunnels.

Another aspect of the invention relates to the provision of devices for the transforming of electromagnetic radiation (especially from the sun) to heat a liquid or gas within a cavity between two or more layers of glass or other preferably transparent or semi opaque material, which may then be transported to the said Biotower and/or to other devices, which may extract the same heat and use it for useful purposes or store the liquid for later use.

In one aspect, the present invention relates to a method and apparatus for exposing microscopic organisms, such as algae, to solar radiation within a liquid such as water, which is preferably maintained at an appropriate temperature for the growth and reproduction of said microscopic organisms, which may preferably be used to augment the functioning of the said Biotower and/or other processes in related and connected systems, in regard to, for example, the decomposition of organic matter and the production of methane gas.

In another aspect, the present invention relates to a method and apparatus for regulating the amount and type of solar radiation that enters a building or other structure.

In another aspect, the present invention relates to a method and apparatus for creating or augmenting the movement of fluid or gas within one or more cavities encased by glass or other preferably transparent or semi opaque material, using thermal syphoning, and/or capillary action and/or mechanical pumping, which may preferably be used to transport the same liquid or gas to the said Biotower and/or to other connected systems, in order to make use of the energy and/or the organic matter contained within the said liquid or gas.

In another form of the invention and applicable to all of the forms of the invention, the said Plasma Glazing may also be formed with one or more air passages that utilizes the thermal energy that is not collected by the said fluid or gas within the said cavity in order to create movement of air in a building or the like, preferably to distribute heat within an architectural space when the external temperature is below a comfortable range and preferably the same air passage may be used to ventilate air within an architectural space when appropriate. In this way the sun's energy may be utilized in various ways; that is a proportion of its radiant energy is filtered and converted into heat in the fluid cavity for use in the Biotower and/or other useful purposes and the convection heat that is not captured by the same fluid may be used to create air movement within a structure, whilst the remaining solar radiation is used to illuminate the interior of the same structure whilst also preferably providing a view out of the same structure.

In another form of the invention and applicable to all of the forms of the invention, the said Plasma Glazing may also form a solar radiation collector that comprises a method and apparatus for hydrogen production utilizing either natural photosynthetic organisms or biomimetic/artificial photosynthetic systems and the said hydrogen produced would preferably be utilized in the said Biotower to augment its functioning, preferably by augmenting the updraft within the said chimney by burning the same hydrogen gas and/or by utilising the same hydrogen gas to power direct fuel cells to generate electricity and heat; the same electricity produced would augment the production of electricity from the turbine driven electricity generators of the same Biotower and the said heat from the said fuel cells would be directed into the chimney of the tower to augment its updraft.

Spiral Cavity

Another aspect of the invention is an method and apparatus for generating or augmenting an updraft within the Biotower by forming a spiral formation in the façade of the said Biotower in such a way as to gather the wind flowing around the tower and direct it into a spiral cavity following the shape of the spirally formed façade, and thus forcing the wind up the spiral cavity drawing air from lower areas within the same cavity. The spiral façade preferably should allow air into its cavity and not out, in this way the air pressure caused by the wind entering the spiral cavity will force air up the spiral cavity as it can only escape from the top of the tower.

Preferably the tower will incorporate all said methods of creating an upward movement of air in such a way that they will augment each other. Preferably the spiral cavity will be divided into two sections; an upper and a lower section along its length. The upper section may be open to the external atmosphere and would use flaps, valves or other devices, which may preferably be computer controlled and, in most instances, be used to allow wind to be drawn into the said upper section and prevent the same wind from exiting the same upper section unless the same wind is nearing the top of the tower. As the air flows up the tower, low air pressure would be created at the base of the tower drawing air through air intake device(s) and/or through a sun heated air cavity "heat trap" in a glass roof at the base of the tower. The lower section of the said cavity would preferably be divided from the upper section with the use of flaps, valves or other devices, which preferably may be computer controlled and, in most instances, be used to allow air to be sucked into the upper section from the lower section and prevent the same wind from returning into the lower section. The lower section is preferably to be connected to the air intake of the tower, which would preferably be at its base and therefore may form the means to supply air to the upper section along its entire length via the said flaps, valves or other devices.

The air from the lower section of the said cavity may be drawn into the upper section of the said cavity by one or both of the two described means. In the first means air would be drawn into the upper section when the air pressure in the said upper section is lower than the air pressure in the said lower section, thus causing air to flow from the lower to the upper section of the spiral cavity in order to equalize the air pressure. The differential in air pressure between the upper and the lower section would be caused by the movement of air up the spiral cavity creating lower air pressure in the upper section the closer it is to the base of the tower. Also, wind may preferably be prevented from entering the upper section of the same cavity in the area close to the base and this should preferably be regulated by computer or (other means) in such a way as to maximise the updraft and sucking power caused by the wind within the spiral cavity.

The centrifugal force acting on air will also cause a differential in air pressure as it moves upward in a spiral formation causing greater air pressure at the outer perimeter of the upper section of the spiral cavity. Preferably the valves, flaps or other devices that divide the upper section from the lower section should be used to allow air to flow from the lower section into the upper section where the air pressure differential is at its greatest (i.e. where it is closest to the inner core).

The second means by which the air may be drawn from the lower section into the upper section of the spiral tower is by a method that makes use of the characteristic, in which the flow of air past a opening draws air into the same opening and into the slip stream of the air. The flaps, valves or other devices that separate the upper section from the lower section may preferably also be used to maximising the drawing of air from the lower section into the upper section of the spiral cavity. This effect, set up when air flowing in the upper section passes over the openings that separate it from the lower section, should preferably be regulated by computer controls or by other means in order to achieve maximum updraft when required.

The wind-inducted movement of air up the spiral cavity of the tower would naturally be dependant on the velocity of the surrounding wind and therefore be sporadic. The same upward air movement within the tower would also be augmented by the upward movement of hot air (hot air being air that is hotter than the outside atmosphere).

The heat chimney method of generating hot air together with the heat trap method will cause air to flow up the spiral cavity of the tower regardless of the wind velocity. This system may also preferably incorporate a vertical shaft that connects the upper spiral cavity at the base of the tower to the lower spiral cavity near the top of the tower providing two ways for the air to flow and depending on a combination of all the conditions, will flow in the direction of the lowest air pressure. As valves, flaps or other devices will preferably be positioned between the vertical shaft and the upper spiral cavity along its length the system may further be augmented by a flow of air between the vertical shaft and the upper spiral cavity when appropriate. When the pressure differential between the upper spiral cavity and the vertical shaft is big enough it will cause air to be sucked into the upper spiral cavity from the vertical shaft and thus increase the velocity of the air movement up the vertical shaft. Preferably this vertical shaft should be positioned close to the core and preferably surround the core in this way the centrifugal forces acting on the air flowing up the spiral cavity may be harnessed to induce increase updraft in the vertical shaft.

Also preferably the system may be used with a plants and vegetation (an interior landscape) established in the core of the building and so configured so as to purify and oxygenate the incoming air and preferably further direct the air to provide a healthy atmosphere for people close by (for example in a large public space or park that may be covered with the said glass roof structure). This interior landscape may preferably be configured in a spiral formation with air, entering from the upper reaches of the tower and flowing down the landscaped spiral, being cooled by the landscape as it flows—the cooling effect promoting the downward flow. Preferably, the cooling effect may be augmented by using the spiral tower to cool water piped from the air conditioning units from surrounding buildings (especially office towers). The by-product of extracting the heat from the water of air conditioning systems is cooled water. As previously mentioned the water would be used in the outer cavities of the tower to promote updraft and the cooled water, in the form of a fine mist spray, would irrigate the landscape. After filtering through the landscape the same water would be piped back into the air conditioning systems from where they originated and thus completing the cycle.

Preferably, the inner spiral is landscaped which purifies air entering from above. Flora may be incorporated preferably into a spiral configuration. The evaporative effect caused by the plants and their irrigation system, cools the air and causes it to flow down the spiral like a river drawing air from above. Plants detoxify and oxygenate the air, which is delivered into public spaces, habitable areas and the like, and preferably pushing used air up and out. The water directed from the cooling towers of surrounding air conditioning plants may preferably be used to help irrigate the plants by creating a fine mist spray over the pants in the central spiral. The heat released through this method rises and may be directed via computer regulated passages into the outer cavity of the structure, which is itself formed into a double spiral and with the appropriate glazing will become a heat trap causing the upward movement of hot air and regulating the heat gain in the inner spiral. The shape of the façade of the structure, with the use of computer regulated flaps, may preferably be used as a wind scoop—capturing the winds and forcing the air to spiral upwards within the tower. An adjacent and lower spiral cavity forms the air intake of the system. The vacuum created by the upward movement of air in combination with a computer regulated "Venturi effect" acting along the entire length of the double outer spiral cavity creates an enormous air pump augmented by the heat released from surrounding buildings via their air conditioning systems within the inner spiral. The suns heat trapped in the outer spiral cavity also may be used to augments the system.

Depending on its size, this system may go a long way towards alleviating the "heat island effect" which threatens most major cities. On still days when there is little breeze to blow away the hot air, the tower, by delivering a large amount of heat high above the city to a single point, will conceivably create a bubble of hot air that will push upward and in effect pierce the bubble of warm air surrounding the city and induce an upward movement thus "draining" the air into the upper atmosphere.

The inner spiral may be a stepped landscape, which purifies air entering from above. The evaporative effect caused by the plants and their irrigation system, cools the air and causes it to flow down the spiral like a river drawing air from above. The water directed from the cooling towers of surrounding air conditioning plants may be used to help irrigate the plants by creating a fine mist spray over the pants in the central spiral. The heat released through this method rises and may be directed via computer regulated passages into the outer cavity of the structure, which is itself formed into a double spiral and with the appropriate glazing will become a heat trap causing the upward movement of hot air and regulating the heat gain in the inner spiral. The shape of the façade of the structure resembles an unfolding leaf which, with the use of computer regulated flaps, becomes a giant wind scoop—capturing the winds and forcing the air to spiral upwards. An adjacent and lower spiral cavity forms the air intake of the system. The vacuum created by the upward movement of air in combination with a computer regulated "venturi effect" acting along the entire length of the double outer spiral cavity creates an enormous air pump augmented by the heat released by the landscaped inner spiral and the suns heat trapped in the outer spiral cavity.

The Biotower may be built at any appropriate scale. A small scale, wind driven version of the helix type versions of Biotower may be used to pump air.

As so called waste products are a valuable resource the current invention offers a means by which to harness sewage, paper and other organic waste by combining it with the heat waste of air conditioning systems and, if necessary, the heat from other sources in order to produce electrical energy, gas and fertilizer.

This is made possible due to the fact that sewage and much organic waste, produce bio gas (consisting mostly of methane gas) when undergoing decomposition under suitable conditions. For this process to occur in a quick and expedient manner it is preferable that the sewage and other organic waste be kept at a temperature of approximately 35 degrees Centigrade in sealed containers.

The water discharged from mechanical air conditioning systems commonly used in office towers and the like is normally at a temperature of 35 degrees Centigrade before it is cooled, which is an appropriate temperature for use in promoting the decomposition of sewage and other organic waste. Preferably the said sewage should be contained in gas extraction mechanisms and kept at the appropriate temperature preferably with the use of heat transferred from the said air conditioning systems and/or other sources of heat and transferred to the same sewage and other organic waste with the use of appropriate heat exchange systems and the process of gas extraction thus facilitated. Once the sewage and other organic waste commences decomposition the heat exchange systems are only needed to maintain the most appropriate temperature and if the process of decomposition causes an increase in temperature that is too high for the most efficient functioning of the system as a whole, the excess heat may be extracted preferably by the same heat exchange system and used to augment the functioning of the Bio Tower.

The gas should preferably be extracted from the same sewage and other organic waste and should preferably be stored in pressurised tanks for later use.

After the methane and other gases have been extracted from the sewage and other organic waste the material should preferably be transferred to another containment area and the heat suitably extracted (preferably during its normal cooling process) for use in augmenting the functioning of the Bio Tower.

The sewage (post methane extraction) in the said containment area should preferably be converted to fertilizer with the use of suitable worms, suitable microorganisms and suitable bacteria and generally kept in the right conditions to promote conversion to fertilizer. Preferably the same containment area should be of an appropriate depth and size to allow the build up of heat during the conversion process, the excess of which should preferably, if feasible, be extracted with an appropriate heat exchange system and used to augment the functioning of the Bio Tower.

Preferably this invention may be further augmented by the use of so called "direct fuel cell" technology, which has the capacity of converting gas such as methane into heat and electricity without the use of combustion. It does this with the use of a chemical process. As part of the process the said methane is converted into hydrogen, which becomes the fuel for the said direct fuel cell. As heat is a by-product of this process and the same heat may preferably, be used by the Biotower to augment the system. The electricity produced will preferably be used to augment the electrical out put of the turbine driven generators incorporated in the Biotower and/or be connected to the electrical power grid or system of the region in which the tower is build.

In general the transfer of excess heat from the various processes that are carried out as part of the Biotower system may preferably be achieved with the use of a heat exchange system, which preferably incorporates water as its medium if an evaporative heat exchange system is incorporated for the release of heat into the tower.

For example, the heat released by the said fuel cells may be released into to the Biotower by the use of an appropriate heat transfer mechanism, which may utilise the passage of water in pipe work in which the same water is used to absorb the heat produced by the said fuel cells and then pumped through preferably well insulated pipe work before being passed through an appropriate heat extraction system such as an evaporative water cooling system, which, via the creation of a fine mist spray, releases heat from water which is carried aloft by the updraft within the Bio Tower. If this process does not reduce the temperature of the water to the optimum temperature required to run the system, the same cooling system may be repeated at a lower level in the tower.

In order to further promote clean environments, the methane produced by the Biotower may be used to run cars or may be converted into hydrogen or other appropriate gas and used to run motor vehicles. If feasible the methane gas may be converted into hydrogen during times when the output of the tower is not being fully utilized and the excess energy is better spend on other internal functions such as gas conversion.

As mentioned in the Heat Chimney description of this specification, much of the heat used to power the Biotower may preferably be collected from various sources according to this invention. These sources are preferably close enough to allow the heat to be transferred to the Biotower using whatever means are feasible and practical.

The said heat sources may include from the heat extracted from buildings using mechanical air conditioning systems, the heat from road surfaces, the heat from concrete and other masonry surfaces, the heat from tunnels, the heat from motor vehicles, the kinetic energy from motor vehicles and any practical means of gathering energy that may be used to augment the functioning of the Bio Tower. For example, as roadways are normally dark in colour, they tend to absorb the heat of the sun. This same heat is stored in the mass of the road surface and in its substratum. This same heat may be transferred to the Biotower by various means including the use of piped water embedded below the surface of the road configured in a manner to facilitate the absorption of the said road heat into the water within the pipe work. The same water may preferably be pumped to the Biotower and cooled so that the heat contained within the water is released into the chimney of the Biotower before being preferably recirculated.

The said pipe work may be installed into the road surface by cutting grooves into the same surface, laying the said pipe work into the same grooves and connecting the pipe work to the Biotower preferably so that the water may be recirculated after the discharge of heat into the tower. The pipe work embedded thus forms a type of heat exchange system that may progressively be installed into an urban environment.

The vehicles travelling upon the same road may preferably be used to generate the energy required to circulate the water from the said road surfaces to the Bio Tower. One possible method for achieving this aim is to use pressure operated mechanisms built into the road surface, which has the capacity to pump water. This may be achieved with the use of one-way valves or the like that allow water to pass in one direction and not the other. If water is squeezed out of the mechanism when a car drives over it, the water may travel in one direction and when the same pressure is released, new water may enter the mechanism ready to be pumped by the weight of another vehicle. Preferably the pumping device would be computer controlled to maximize the efficiency of the entire system, as is the case for all the various aspects and operable parts of the invention.

An appropriate version of the Biotower may be powered primarily from the heat gathered road surfaces and used anywhere in practical proximity to road surfaces for the generation of electricity and/or for the ventilation of tunnels, for example.

Heat may also be gathered from tunnels and discharged into the Bio Tower. A similar heat exchange system as described for used with road surfaces may also be used which transfers the heat gathered with the use of water. As the heat of tunnels may also be vented directly into the Bio Tower, the same heat exchange system may be used to cool air in the tunnel that is required to travel within a downward sloping tunnel in order to vented into the chimney of the Bio Tower. The Biotower may therefore use more than one method of extracting heat from a heat source and preferably the two methods will complement each other.

Water pipes cast in concrete also may form another form of heat exchange, which may be especially suitable for removing heat from surfaces in urban environments that are warmed by the sun. Preferably the water pipes would be so configured so as to allow the circulation of the water between the Biotower and the source of the heat in such a way as to maximize this heat exchange.

Any feasible means may be used to transfer heat from an appropriate energy source to the Bio Tower, especially if that energy source was problematic as is the case with heat exhausted from air conditioning systems.

Another energy source that may preferably be drawn upon is so called "Plasma Glazing" (as named by the author of this present invention).

Microwave technology may also prove a good way to transfer energy into the Biotower for example. Energy may be beamed to the tower from any practical place including from satellites which may convert the sun's radiant energy into microwaves that may preferably be beamed to the top of the Biotower which should preferably be as high as possible to avoid as many birds as possible. Extraneous electromagnetic radiation may be gathered and send to the Biotower via microwave technology.

All of the above configurations and systems or any combination of the above systems may be integrated with subways and/or road tunnel systems in order to ventilate them and used the heat exhausted from them to augment the above mentioned systems. In this way the heat generated from motor vehicles, trains and other equipment as well as people may be used to preferably generate electricity and preferably promote the entry of clean air into urban and other environments.

BRIEF DESCRIPTION OF THE DRAWINGS

The present invention is described in the detailed description which follows, in reference to the noted plurality of drawings by way of non-limiting examples of exemplary embodiments of the present invention.

FIG. 1 shows a cross sectional view of one example of a Biotower according to one embodiment of the invention which incorporates a hot air chimney.

FIG. 2 shows in plan view the embodiment of invention depicted in FIG. 1.

FIG. 3 shows a cross sectional view of a biotower according to one embodiment of the invention.

FIG. 4 shows in plan view the same embodiment of FIG. 3 and the section lines indicate where the cross section of FIG. 3 is viewed.

FIG. 21 shows a schematic cross section indicating a form of plasma glazing

FIG. 22 shows a schematic elevation indicating a form of plasma glazing according to this invention viewed facing the transparent member.

FIG. 23 shows a schematic cross section indicating a form of plasma glazing according to this invention, which may be used as an architectural feature such as a reflection pond or water feature.

FIG. 24 shows a schematic cross section indicating a form of plasma glazing according to one embodiment and incorporated into an awning structure, which may be used as an architectural device to provide shelter to pedestrians.

FIG. 25 shows a schematic cross section indicating a form of awning structure utilizing double-glazing.

FIG. 26 shows a schematic cross section indicating a form of heat absorption system according to one embodiment.

FIG. 27 shows a schematic cross section indicating a form of heat absorption system which is added to the exterior of an existing surface such as a roadway.

DESCRIPTION OF PREFERRED EMBODIMENTS

Figure 5:
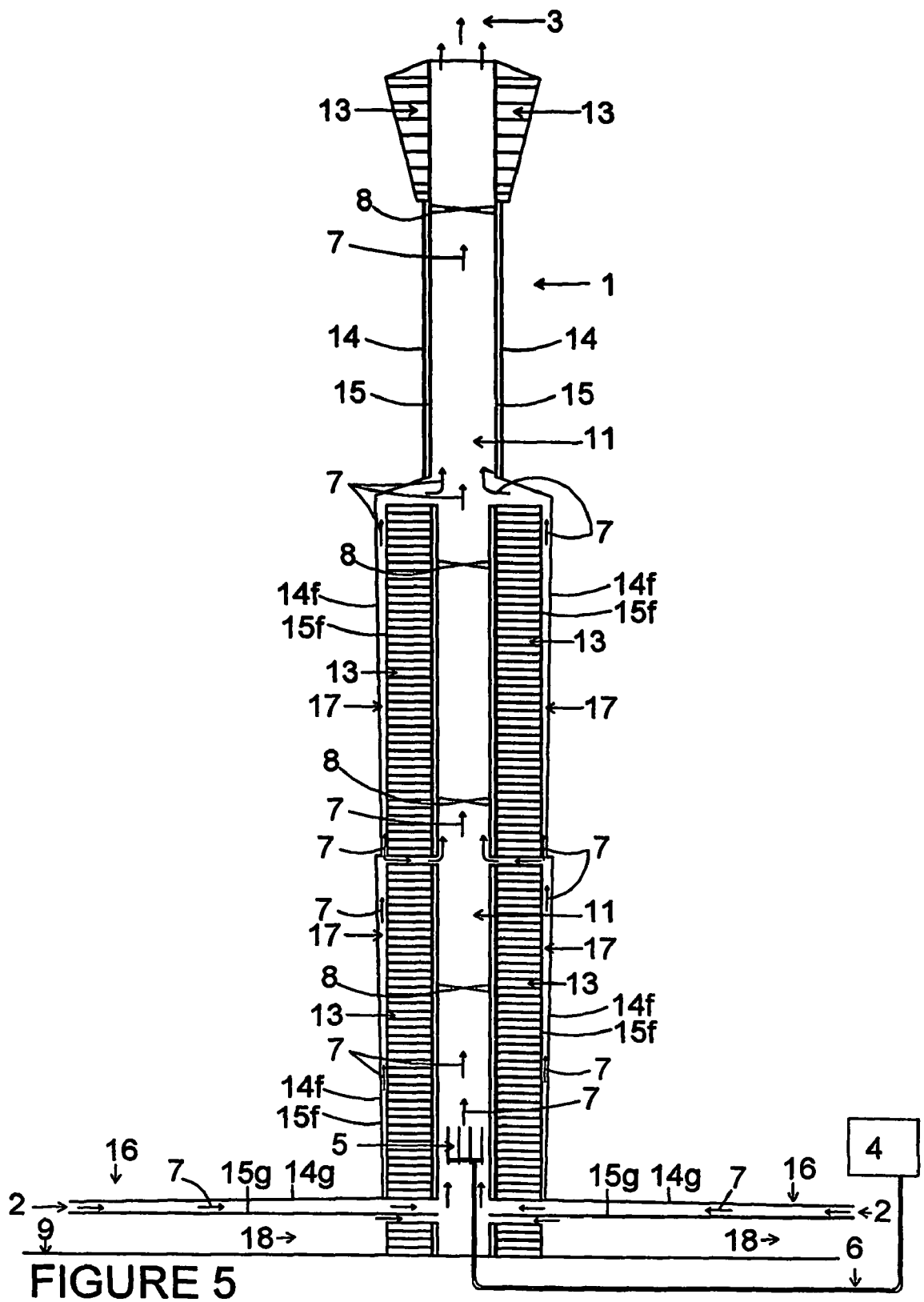
FIG. 5 shows a cross sectional view of one embodiment of a Biotower which incorporates a glass roof and a chimney with its base at ground level.

To assist with the understanding of the invention, reference will now be made to the accompanying drawings, which show examples and schematic representations of the invention. It should be realised that the forms of the invention described and illustrated are non-limiting.

Throughout the drawings, like numerals will be used to identify similar features, except where expressly otherwise indicated.

In the drawings:

FIG. 1 shows a cross sectional view of one example of a Biotower according to this invention, which incorporates a hot air chimney 1 with its base at ground level 9 connected to air conditioning system(s) 4.

FIG. 2 shows in plan view the same example of a Biotower according to this invention depicted in FIG. 1 and the section lines 10 indicate where the cross section of FIG. 1 is viewed relative to the plan of FIG. 2.

Referring to FIG. 1 it can be seen that the Biotower according to this invention, in a very basic form, comprises a tall vertical chimney 1 mounted at its base at ground level 9. The same Biotower incorporates an air intake system 2 at the lower portion of the said chimney 1 and an air outlet 3 its top. Heat gathered from the air conditioning systems 4 of nearby buildings is released with the use of a heat exchange mechanism 5 into the vertical shaft 11 within the chimney 1 to create an upward flow of air 7, which is preferably used to drive turbines 8 or other devices for use in the production of electricity.

The external cladding 14 and the internal cladding 15 may comprise an opaque, semi opaque or transparent material however it is preferable that they be made of a transparent material that allows as much radiant solar energy as possible or feasible to pass through it into the shaft 11 and prevent the same energy from passing back out again and thereby effectively trapping much of the said heat within the shaft 11 of the chimney 1 in order to augment the updraft of air 7 within the chimney 1.

This said Biotower, should preferably be connected to as many air conditioning systems 4 as feasible and/or possible, especially air conditioning system used to cool office towers and other large air conditioned buildings with large centralized cooling systems 4, in order to reduce the heat island effect and to generate as much electricity as possible, which preferably may service the same city. The updraft of air produced 7, as well as used to generate electricity, may preferably also be used to rid urban environments of polluted air.

Normally water heated by the said air conditioning systems 4 may be transported via pipes 6 to the tower and the heat released through a process that uses the 'evaporative effect' to separate the heat energy from the water and release the same heat into the air within the shaft 11 of the chimney 1 and thereby cool the water. This cooled water should preferably be returned to the air conditioning system(s) 4 from which it came and operate on a continuous cycle and form a circulatory system.

Referring to FIG. 2 it can be seen that the Biotower according to this invention, incorporates a chimney 1 which includes at least one vertical shaft 11 with a means to allow air to enter the same shaft 11 using a preferably controllable air intake device 2.

Refrigerants or a suitable gas may also be used to transport the same heat to the Biotower from nearby structures. Any other feasible means of transferring heat from nearby structures and heat sources to the said Biotower may also be used.

The heat gathered should preferably be released in the said Biotower in such a manner as to maximize the upward flow of air 7 and thereby maximize the capacity of the system to generate electricity and/or ventilate urban environments.

FIG. 3 shows a cross sectional view of one example of a Biotower according to this invention, which incorporates a double layer glass roof 16 and a chimney 1 with its base at ground level 9, which is connected to air conditioning systems 4.

FIG. 4 shows in plan view the same example of a Biotower according to this invention depicted in FIG. 3 and the section lines 10 indicate where the cross section of FIG. 3 is viewed relative to the plan of FIG. 4.

Referring to FIG. 3 it can be seen that the Biotower according to this invention, in a very basic form, comprises a tall vertical chimney 1 mounted at its base at ground level 9. The same Biotower incorporates an air intake system 2 preferably at the perimeter of the glass roof 16 and an air outlet 3 at the top of the said biotower. Heat gathered from the air conditioning systems 4 of nearby buildings is is released with the use of a heat exchange mechanism 5 into the vertical shaft 11 within the chimney 1 to create an upward flow of air 7, which is preferably used to drive turbines 8 or other devices for use in the production of electricity.

The external cladding 14 and the internal cladding 15 comprise a transparent material that allows as much radiant heat as possible or feasible to pass through it into the shaft 11 and prevent the same heat from passing back out again and thereby effectively trapping much of the said heat within the shaft 11 of the chimney 1 in order to augment the updraft of air 7 within the chimney 1. This said Biotower, should preferably be connected via an appropriate heat transport/circulatory system 6 to as many air conditioning systems 4 as feasible and/or possible, especially air conditioning systems 4 used to cool office towers and other large air conditioned buildings with large centralized cooling systems 4.

Outer layer of glass roof 14g allows heat and light to pass through from the outside, but prevents the majority of the heat from passing back out from the inside to the outside.

The inner layer of glass roof 15g reflects the heat back so that it is retained within the cavity between the two layers of glass 15g and 14g and the system is so configured in such a way that the same trapped heat will flow up into the shaft 11 of the said Biotower.

Also preferably cool clean air from the outside of the chimney 1 may be drawn down to provide cool clean air to the space under the glass roof and this may be achieved by configuring the system in such a way so as to use the low air pressure generated at the base of the tower, created by the updraft of air rising in the tower, to draw downward flowing air 7d through air intake 2d entering shafts, ducts or air cavities 11d surrounding or within the biotower and preferably located on the side of the said tower that receives little or no sunlight.

Referring to FIG. 4 it can be seen that the Biotower according to this invention, incorporates a chimney 1 which includes at least one vertical shaft 11 with a means to allow air to enter the same shaft 11 normally via a glass roof 16 using a preferably controllable air intake 2.

Refrigerants or a suitable gas may also be used to transport the same heat to the Biotower from nearby structures. Any other feasible means of transferring heat from nearby structures to the said Biotower may also be used.

The heat gathered should preferably be released in the said Biotower in such a manner as to maximize the upward flow of air 7 and thereby maximize the capacity of the system to generate electricity and/or ventilate urban environments.

FIG. 5 shows a cross sectional view of one example of a Biotower according to this invention, which incorporates a glass roof 16, and a chimney 1 with its base at ground level 9, which is connected to air conditioning systems 4 and also comprises commercially rentable, habitable or otherwise usable space for purposes other than power generation or urban ventilation 13.

Referring to FIG. 5 it can be seen that the Biotower according to this invention comprises a tall vertical chimney 1 mounted at its base at ground level 9 and incorporates an air intake system 2 preferably at the perimeter of the glass roof 16 and an air outlet 3 at the top of the said Biotower. Heat gathered from the air conditioning systems 4 of nearby buildings is released with the use of a heat exchange mechanism 5 into the vertical shaft 11 within the chimney 1 to create an upward flow of air 7, which is preferably used to drive turbines 8 or other devices for use in the production of electricity.

The external cladding 14 and the internal cladding 15 comprise a transparent material that allows as much radiant heat as possible or feasible to pass through it into the shaft 11 and prevent the same heat from passing back out again and thereby effectively trapping much of the said heat within the shaft 11 of the chimney 1 in order to augment the updraft of air 7 within the chimney 1.

This said Biotower, should preferably be connected via an appropriate heat transport/circulation system 6 to as many air conditioning systems 4 as feasible and/or possible, especially air conditioning systems 4 used to cool office towers and other large air conditioned buildings with large centralized cooling systems 4.

Preferably the glass roof 16 may be utilized to capture heat radiating from the sun in order to augment the updraft of air in the shaft 11. The external layer of glass 14g allows heat and light to pass through from the outside, but prevents the majority of the heat from passing back out from the inside to the outside. The inner layer of glass 15g reflects the heat back so that it is retained within the cavity between the two layers of glass 15g and 14g and the system is so configured in such a way that the same trapped heat will flow up into the shaft 11 of the said Biotower.

Habitable areas including office space, hotels, apartments, lookouts and restaurants 13 may be integrated with the said Biotower so that the building may house more than one function and enhance its economical feasibility.

Preferably the façade cavity 17 may be utilized to capture heat radiating from the sun in order to augment the updraft of air in the shaft 11. The external layer of glass 14f allows heat and light to pass through from the outside, but prevents the majority of the heat from passing back out from the inside to the outside. The inner layer of glass 15f reflects the heat back so that it is retained within the cavity between the two layers of glass 15f and 14f and the system is so configured in such a way that the same trapped heat will flow up into the shaft 11 of the said Biotower.

Figure 6:
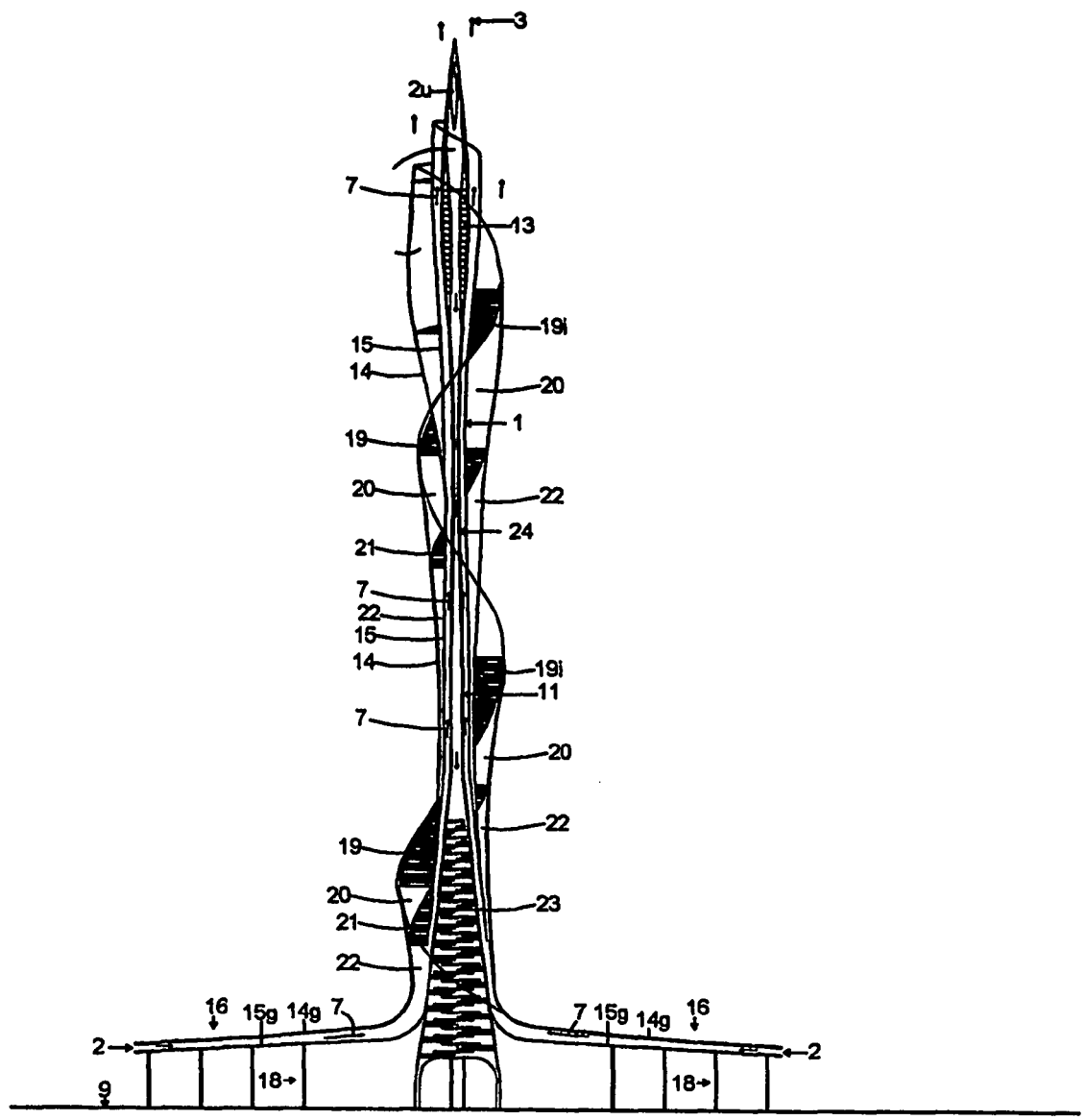
FIG. 6 shows a cross sectional view of a Biotower according to the invention, which incorporates a glass roof and a chimney with its base at ground level.

FIG. 6 shows a cross sectional view of one example of a Biotower according to this invention, which incorporates a glass roof 16, and a chimney 1 with its base at ground level 9, which is connected to air conditioning systems. Commercially rentable, habitable or otherwise usable space for purposes other than power generation or urban ventilation 13 is also shown.

Figure 7:
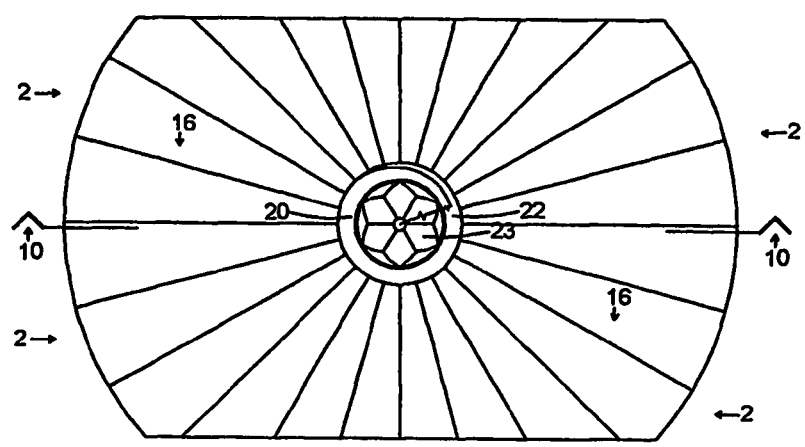
FIG. 7 shows in plan view the same example of a Biotower according to this invention depicted in FIG. 6

FIG. 7 shows in plan view the same example of a Biotower according to this invention depicted in FIG. 6 and the section lines 10 indicate where the cross section of FIG. 6 is viewed relative to the plan.

Figure 8:
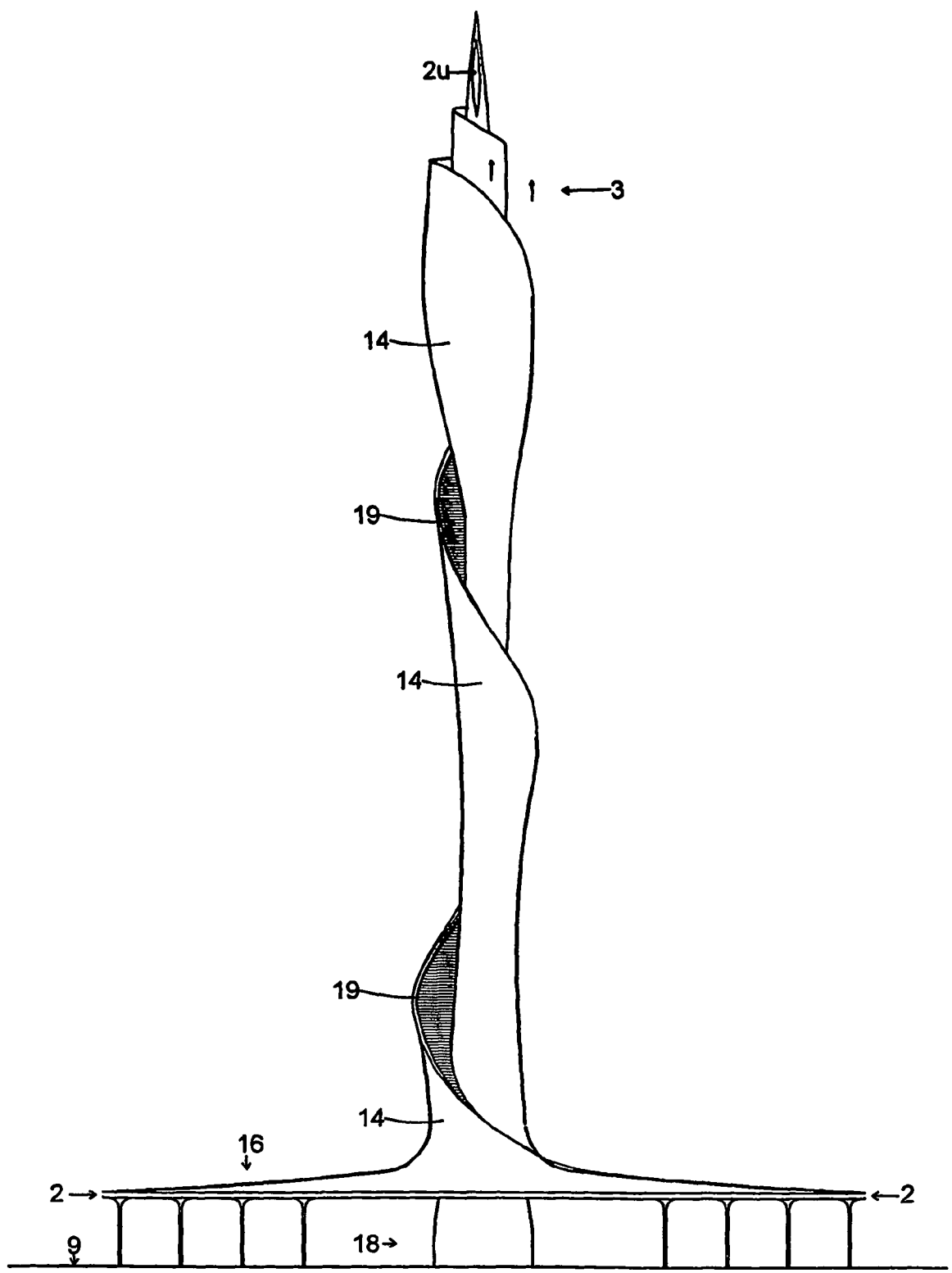
FIG. 8 shows a Biotower according to one embodiment clad in a transparent material and having means to draw passing wind into the helix shaped cavities with the tower through the louvers.

FIG. 8 shows a view in elevation of the same example of a Biotower according to this invention depicted in FIG. 6.

Referring to FIG. 6 it can be seen that the Biotower according to this invention comprises a tall vertical chimney 1 mounted at its base at ground level 9. The same Biotower incorporates an air intake system 2 preferably at the perimeter of the glass roof 16 and air outlet(s) 3 at the top of the said Biotower. Heat gathered from the air conditioning systems of nearby buildings is released into the vertical shaft 11 to create an upward flow of air 7, which is preferably used to drive turbines or other devices for use in the production of electricity.

The external cladding 14 and the internal cladding 16 comprise a transparent material that allows as much radiant heat as possible or feasible to pass through it into the shaft 11 and prevents the same heat from passing back out again and thereby effectively trapping much of the said heat within the shaft 11 of the chimney 1 in order to augment the updraft of air 7.

This said Biotower, should preferably be connected via an appropriate heat transport system 6 to as many air conditioning systems 4 as feasible and/or possible, especially air conditioning systems 4 used to cool office towers and other large air conditioned buildings with large centralized cooling systems 4.

Preferably the glass roof 16 may be utilized to capture heat radiating from the sun in order to augment the updraft of air in the shaft 11. The external layer of glass 14g allows heat and light to pass through from the outside, but prevents the majority of the heat from passing back out from the inside to the outside. The inner layer of glass 15g reflects the heat back so that it is retained within the cavity between the two layers of glass 15g and 14g and the system is so configured in such a way that the same trapped heat will flow up into the shaft 11 of the said Biotower.

Habitable areas 13 including, lookouts and restaurants may be integrated with the said Biotower so that the building may house more than one function.

Preferably the upper spiral cavity 20 and the lower spiral cavity 22 may be utilized to capture heat radiating from the sun in order to augment the updraft of air. The external layer of glass 14 allows heat and light to pass through from the outside, but prevents the majority of the heat from passing back out from the inside to the outside.

The glass roof 16 may also be utilized to filter heat radiating from the sun. The external layer of glass 14g allows heat and light to pass through from the outside, but prevents the majority of the heat from passing back out from the inside to the outside. The inner layer of glass 15g reflects the heat back so that it is retained within the cavity between the two layers of glass 15g and 14g and the system is so configured in such a way that the same trapped heat will flow up into the shaft 11 of the said Biotower. The space 18 below the glass roof 16 may preferably be suitable as a habitable space, which may be for use as a covered park or as a large all weather public facility for people, plants and animals.

The louvers 19 allow wind to pass through and into the upper spiral cavity 20, forcing the wind to flow up the spiral. The same louvers 19 also prevent the wind from escaping from the upper spiral cavity 20 into the outside atmosphere, especially when the louvers 19 are on the leeward side of the tower. Preferably the louvers 19 are transparent to allow light and heat into the upper spiral cavity 20.

Valves, flaps, computer regulated openings between the vertical shaft 1 and the upper and lower spiral cavity 20 and 22 may preferably be used to regulate air flow between the two vertical shafts 1 the spiral cavities 20 and 22 and may be used to increase the efficiency of the system.

Valves, flaps, computer regulated openings between the upper and lower spiral cavity 20 and the lower spiral cavity 22 may preferably be used to regulate air flow and may be used to increase the efficiency of the system but utilizing the passage of air in the upper spiral cavity to draw air from the lower spiral cavity.

Preferably, the updraft of air 7 created by the system may be used to generate electricity with the use of turbines (not shown in this diagram) positioned within the tower or within the air intake to the glass roof or within the glass roof itself. Also, preferably, a combination of all three above mentioned positions may also be incorporated.

Preferably an inner part of the tower may have a landscaped area configured in a spiral formation 23 in such a way that air, as it is cooled, may draw down air through the intake 2u into the central shaft 24 into the spiral landscape 23, preferably flowing through flora within the landscaped areas. In this way this downward flowing air is further cooled and oxygenated by being in contact with many plants. The same air flowing to the bottom of the tower may then be directed to an area that is preferably of benefit to people and/or animals, such as large public urban space 18 below the glass roof 16. The air intake opening 2u may preferably be on four sides of the top of the central shaft 24. The said air intake 2u may preferably be computer regulated so that one, two, three of all four openings may operational depending on wind conditions and other factors normally determined by factors that maximize the efficiency of the system.

Referring to FIG. 7 it can be seen that the Biotower according to this invention comprises a transparent roof 16 surrounding the base of Biotower housing spiral cavities 20 and 22 and spiral landscape 23. The same Biotower incorporates an air intake system 2 preferably at the perimeter of the glass roof 16.

Referring to FIG. 8 it can be seen that the Biotower according to this invention comprises a tower preferably clad in a transparent material 14 and has a means to draw passing wind into the helix shaped cavities with the tower through the louvers 19 in such a way as to create an updraft within the tower, drawing in air through the glass roof 16 through the air intake openings 2 about its perimeter.

Figure 9:
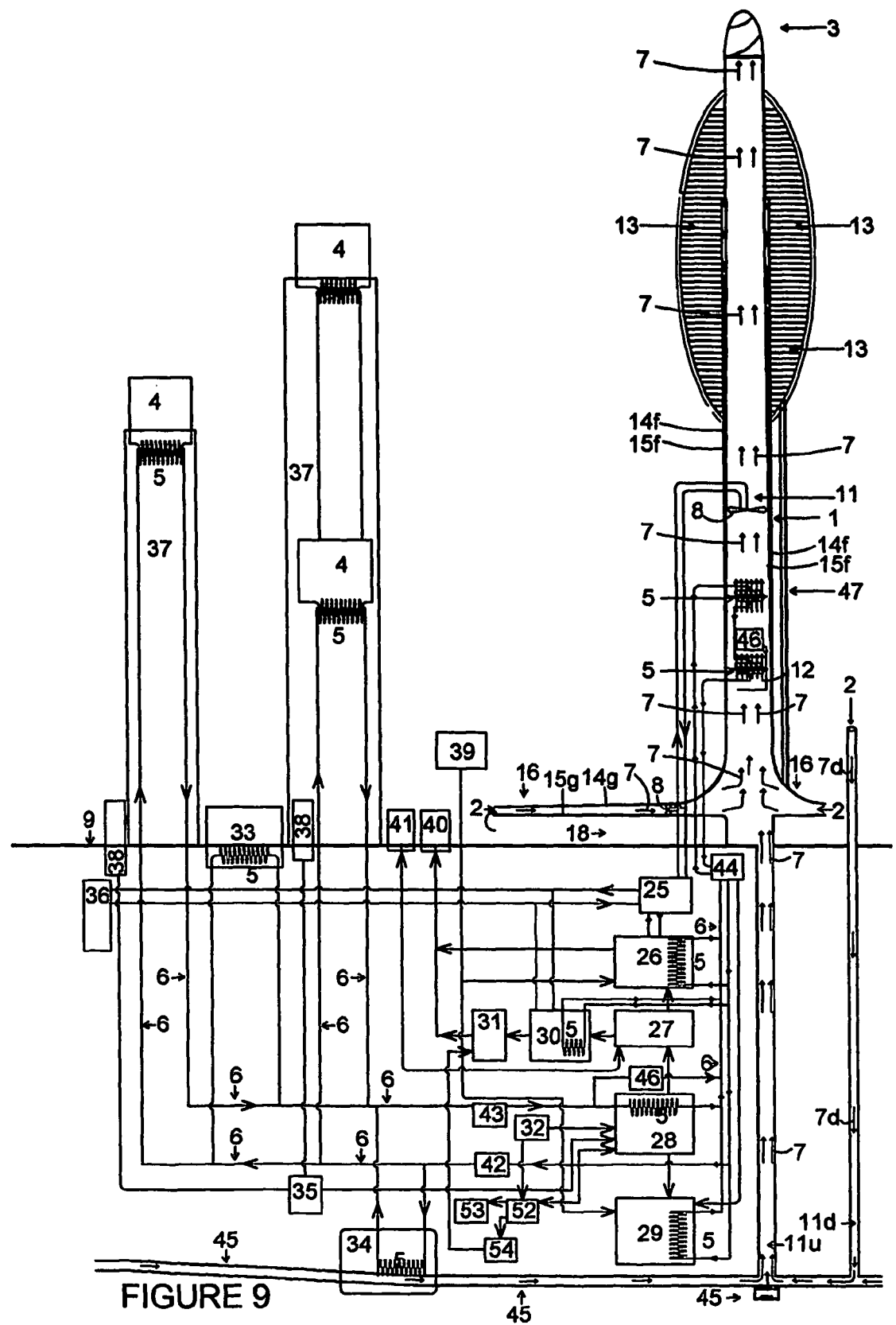
FIG. 9 shows a schematic diagram indicating an example of possible interrelationships of various functions of the Biotower.

FIG. 9 shows a schematic diagram indicating an example of possible interrelationships of various functions of the Biotower according to this invention, which incorporates a glass roof 16, and a chimney 1 with its base at ground level 9 below which are indicated functions that may preferably be carried out below ground level. Various functions are incorporated that produce heat as a by-product, which may be harnessed to augment the updraft of air in the shaft 11. Usable space 13 including commercially rentable, habitable or space for purposes other than power generation or urban ventilation is also shown.

Referring to FIG. 9 it can be seen that the Biotower according to this invention comprises a tall vertical chimney 1, an air intake system 2, preferably at the perimeter of the glass roof 16 and an air outlet 3 at the top of the said Biotower. Heat gathered from the air conditioning systems 4 of nearby buildings is released with the use of a heat exchange mechanism(s) 5 into the vertical shaft 11 within the chimney 1 to create a flow of air 7, which is preferably used to drive turbines 8 or other devices for use in the production of electricity.

The external cladding 14f and the internal cladding 15f comprise a transparent material that allows as much radiant heat as possible or feasible to pass through it into the shaft 11 and prevent the same heat from passing back out again and thereby effectively trapping much of the said heat within the shaft 11 of the chimney 1 in order to augment the updraft of air 7 within the chimney 1.

Preferably the glass roof 16 may be utilized to capture heat radiating from the sun in order to augment the updraft of air in the shaft 11. The external layer of glass 14g allows heat and light to pass through from the outside, but prevents the majority of the heat from passing back out from the inside to the outside. The inner layer of glass 15g reflects the heat back so that it is retained within the cavity between the two layers of glass 15g and 14g and the system is so configured in such a way that the same trapped heat will heat the air within the same cavity and flow up into the shaft 11 of the said Biotower.

This said Biotower, should preferably be connected via an appropriate heat transport/circulation system 6 to as many air conditioning systems 4 servicing buildings 37 as feasible and/or possible.

Air-conditioning systems 4 normally transfer the heat energy that they extract from building interiors into water with some form of heat transfer mechanism 5 in order to make the heat easier to dissipate into the air. Instead of transferring this heat energy 43 into the outside air it may be piped via water pipes or some other form of heat transport mechanism 6 to the biotower and released into the rising air 7 in shaft 11 and thereby increasing the velocity of the rising air 7. This same heat energy 43, before it is released into the shaft 11, may also be used to increase the temperature of sewage 38 (and other organic matter 32, such as paper and food waste) from buildings via a sewerage system 35 within an airtight container(s) 28 in order to promote the production of methane gas, which may then be stored in container(s) 27. After the said methane is extracted from the organic matter in container(s) 28 the heat may be extracted via heat transfer mechanism 5 or otherwise released into the shaft 11 in order to augment the updraft of air 7 within the chimney 1. When heat energy 43 is not required in organic matter container 28, it may be directed to the heat exchange 5 in shaft 11 via bypass 46. After heat energy 43 is transferred to the air 7 in shaft 11 the cooled heat transport medium (such as water) 42 is preferably re-circulated via heat transport/circulation mechanism 6 to the various heat sources.

The methane gas (biogas) stored in container(s) 27 may preferably be used to fuel direct fuel cells 26, which convert biogas (containing methane gas) into hydrogen for conversion into electricity and heat. The electrical output of the same fuel cells 26 may preferably be used to augment the electrical output of the biotower 25, especially when the updraft of air 7 in the shaft 11 is rising at a relatively low velocity. The heat output of the same direct fuel cells 26 may preferably be released into the shaft 11 and augment the updraft of air 7 and further increases the capacity of the system to generate electricity. This same release of heat into the shaft 11 may be achieved via heat transfer mechanisms 5 and heat transport/circulation mechanisms 6 or by directing the heat emanating from the direct fuel cells 26 into the shaft 11 via direct air flow.

After the organic matter (Including sewage) in container(s) 28 has had biogas (including methane) extracted and stored in containers 27 it may then be stored in containers 29 and further decomposed. Heat released by this process may be used to augment the updraft 7 in shaft 11. Worms and microbes may preferably be used to further break down the organic matter in container 29 and excess water may preferably used to irrigate parklands and gardens or other useful purposes.

Where possible and/or feasible heat from other sources may be utilized to augment the system. Underground tunnels 45 may be used as a source of heat. The air heated by vehicles in such tunnels 45 may be directed into the shaft 11 of the chimney 1, via a stack or duct 11u, which is preferably vertical and below shaft 11 in order to maintain the momentum of airflow 7. In addition to air entering the tunnels 45 via entrances, downward flowing air 7d may be drawn into the tunnels via shaft 11d. Heat may also be extracted from tunnels 45 by heat exchange systems 34 that operate in a similar manner to which heat is transferred from air conditioning systems 4 to the Biotower, via heat transport/circulation system 6.

If the heat carrier medium 42 used is mostly water, and if the heat energy 43 is released into the air 7 by creating a fine mist spray, the air 7 will be ionized augmenting the extraction of impurities from the same air 7 into the same heat carrier medium 42. This water may preferably have the impurities removed with the use of filtering mechanism 44 before being re-circulated. The impurities may preferably be deposited in organic waste containment mechanism 29 and suitably transformed by the biological processes within.

When required the biogas stored in containment mechanism 27 may be transferred to a biogas to hydrogen conversion mechanism 30 and, after conversion to hydrogen, stored in hydrogen storage mechanism 31 and may preferably be used to power hydrogen fueled vehicles via a refueling mechanism 40. Biogas stored in methane storage mechanism 27 may be used to fuel vehicles via refueling mechanism 41.

Air supply 39 may be utilized by any of the processes were required including biomass decomposition and conversion 29.

Non methane producing bacteria 52, fermentative bacteria 53 and hydrogen producing acetogenic bacteria 54 may preferably also be incorporated into the present invention and utilized in any practical way to augment its functionality of this invention.

The updraft of air in shaft 11 may be augmented by wind driven air pump or extraction mechanism 3.

Habitable areas including office space, hotels, apartments, lookouts and restaurants 13 accessed by egress means 47 may be integrated with the said Biotower so that the structure may house more than one function and enhance its economical feasibility.

Figure 10:
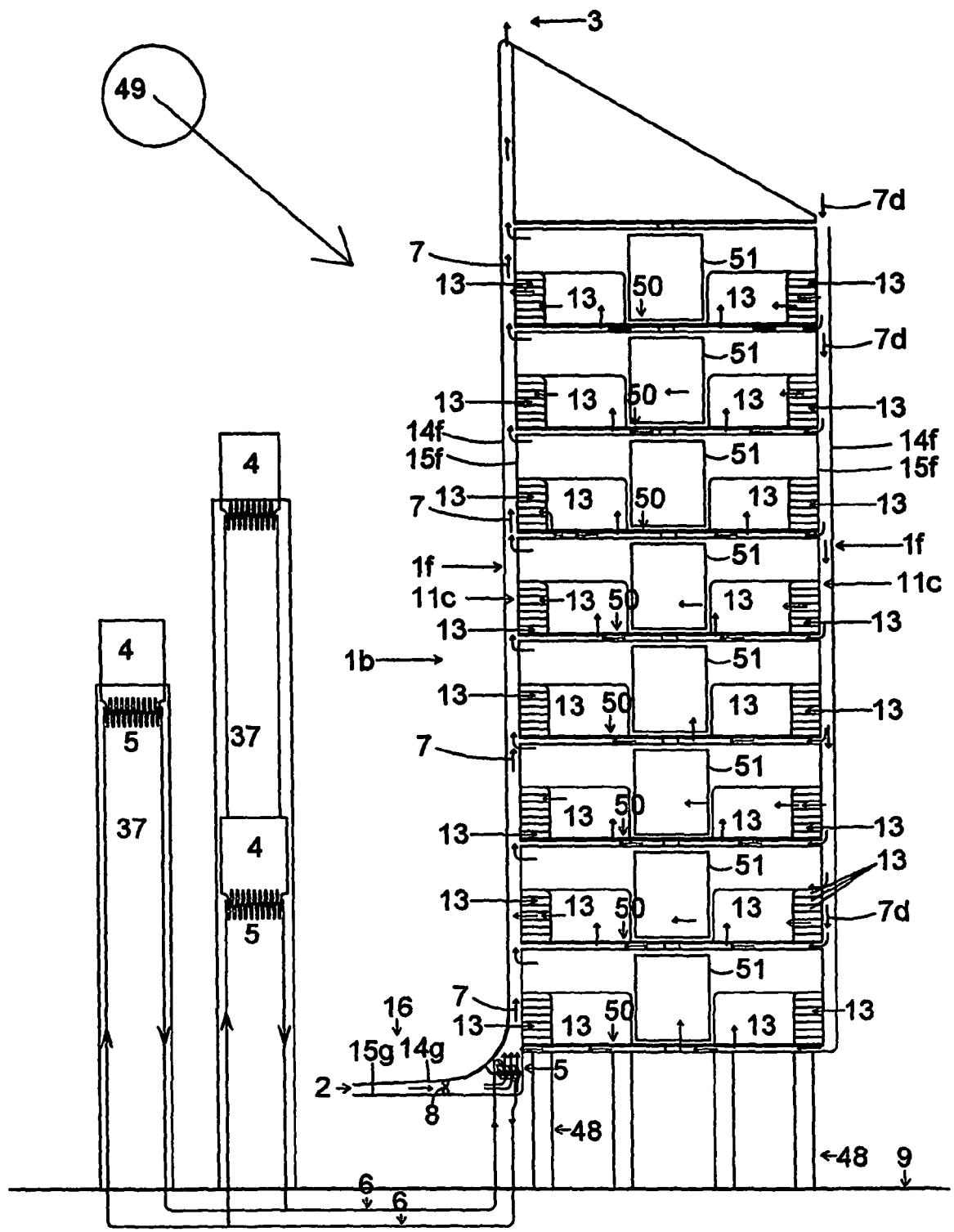
FIG. 10 shows a schematic cross section of a Biotower according to this invention, which incorporates a glass roof and cavity façade.

FIG. 10 shows a schematic cross section indicating an example of a Biotower according to this invention, which incorporates a glass roof 16 and cavity façade 1f. The various functions described on FIG. 9 of this invention and other examples of this invention that produce heat as a by-product, may be harnessed to augment the updraft of air in the shaft 11. Usable space 13 including habitable space for purposes other than power generation or urban ventilation is also shown. The building 1b is supported on columns 48 with its base at ground level 9

Referring to FIG. 10 it can be seen that the Biotower according to this invention comprises a tall vertical cavity façade 1f, an air intake system 2, preferably at the perimeter of the glass roof 16 and an air outlet 3 at the top of the said Biotower. Heat gathered from the air conditioning systems 4 of nearby buildings is transferred with the use of a heat exchange mechanism(s) 5 into the air within façade cavity 1f between transparent lining members 14f and 15f to create a flow of air 7, which is preferably used to drive turbines 8 or other devices for use in the production of electricity.

The external cladding 14f and the internal cladding 15f comprise a transparent material that allows as much radiant heat as possible or feasible to pass through it into the cavity shafts 11c and prevent the same heat from passing back out again and thereby effectively trapping much of the said heat within the cavity shafts 11c in order to augment the updraft of air 7 within the cavity façade 1f.

Preferably the façade cavity 1f would be divided into several cavity shafts 11c and these cavity shafts 11c would preferably be arranged adjacent to each other in a vertical configuration and cover the entire façade of the building. An upward movement of air 7 will be induced with the cavity shafts 11c, which are exposed to the rays of the sun 49. If heat is transferred into the façade cavity 11c from sources other than direct solar radiation, such as from air conditioning systems 4, the upward flow of air 7 may preferably be augmented. This same updraft of air 7 may be utilized to augment the ventilation system of the building by drawing air through ducts, voids, cavities, spaces and the like within the building. As the air will be cooler within the façade cavities 11c that are not exposed to the suns rays 49 relative to the façade cavities 11c that are not exposed to the sun's rays 49, downward flowing air 7d may be induced in the façade cavities 11c that are not exposed to the same rays of the sun 49. In this way air from the area near of upper part of the building may be drawn upon to ventilate the habitable area of the building and thus improving internal air quality.

Preferably the glass roof 16 may be utilized to capture heat radiating from the sun in order to augment the updraft of air in the cavity shafts 11c. The external layer of glass 14g allows heat and light to pass through from the outside, but prevents the majority of the heat from passing back out from the inside to the outside. The inner layer of glass 16g reflects the heat back so that it is retained within the cavity between the two layers of glass 15g and 14g and the system is so configured in such a way that the same trapped heat will heat the air within the same cavity and flow up into the shafts 11c which are exposed to solar radiation 49.

Landscaped spaces 50 within the structure may preferably be used as recreational spaces for occupants of the building according to this invention as well as serving to clean and oxygenate air passing through. Large fenestrations 51 allow for light to enter the building as well as regulate air flow into and out of the said structure.

This said Biotower, should preferably be connected via an appropriate heat transport/circulation system 6 to as many air conditioning systems 4 servicing buildings 37 as feasible and/or possible.

Figure 11:
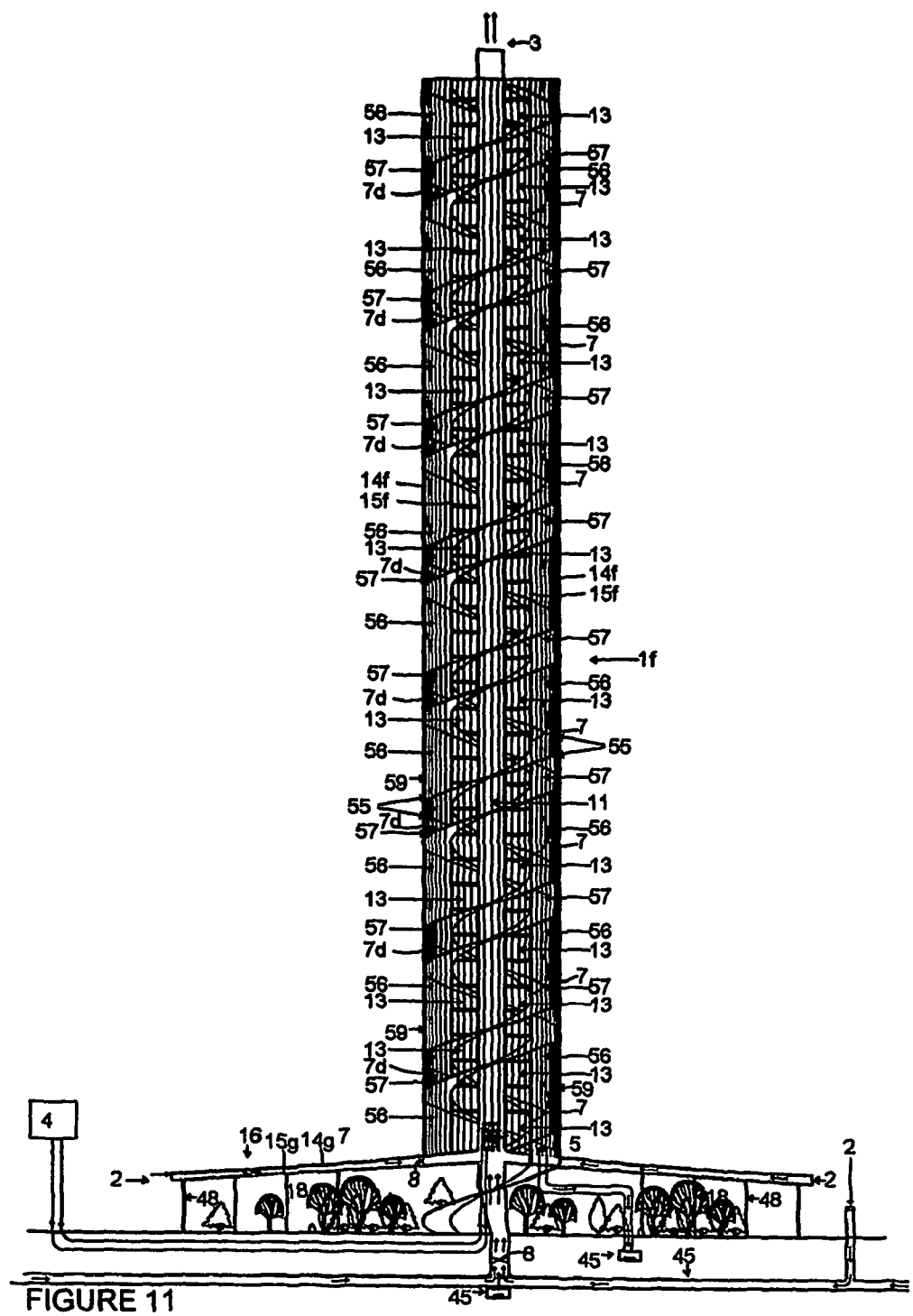
FIG. 11 shows a schematic cross sectional elevation of an embodiment of a Biotower according to this invention which incorporates a glass roof and double helix envelope and a central shaft.

FIG. 11 shows a schematic cross sectional elevation indicating an example of a Biotower according to this invention, which incorporates a glass roof 16, double helix envelope 55 and a central shaft 11 containing updraft of air heated by hot water from air-conditioning system and other heat sources. The various functions described on FIG. 9 of this invention and other examples of this invention may be incorporated in this example of the invention. Usable space 13 including habitable space for purposes other than power generation or urban ventilation is also shown. The building is supported in columns 48 resting at ground level 9.

Figure 12:
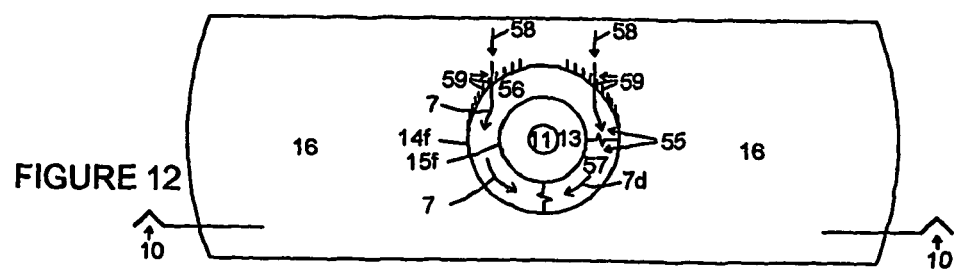
FIG. 12 shows in plan view the same example of a Biotower according to that depicted in FIG. 11.

FIG. 12 shows in plan view the same example of a Biotower according to this invention depicted in FIG. 11 and the section lines 10 indicate where the cross sectional elevation of FIG. 11 is viewed relative to the plan.

Referring to FIG. 11 and FIG. 12 it can be seen that the Biotower according to this invention comprises a double helix envelope 55, an air intake system 2, preferably at the perimeter of the glass roof 16, and an air outlet 3 at the top of this said Biotower. Heat gathered from the air conditioning systems 4 of nearby buildings is transferred with the use of a heat exchange mechanism(s) 5 into the shaft 11, which is preferably used to drive turbines 8 or other devices for use in the production of electricity.

The external cladding 14f and the internal cladding 15f comprise a transparent material that allows as much radiant heat as possible or feasible to pass through it into the upward flowing helix type façade cavity 56 and prevent the same heat from passing back out again and thereby effectively trapping much of the said heat within the same façade cavity 56 in order to augment the updraft of air 7 within the cavity façade 56.

Preferably transparent louvres, flaps, computer or manually regulated or other wind directing devices 59 to façade 14f of helix cavity 56 may direct wind air flow 58 into the helix type façade cavity 56 in such a way as to force air to flow in an upward flowing spiral type motion.

The same louvers or other wind directing devices 59 also prevent the wind 58 from escaping from the same spiral cavity 56 into the outside atmosphere, especially when the louvers are on the leeward side of the tower and therefore creating a continuous movement of air up the spiral cavity 56. Preferably the same spiral cavity 56 will expand in volume as it rises in height, which may be achieved by increasing the width of the spiral cavity 56 as it rises and/or by increasing the slope of the spiral cavity 56 as it rises.

Preferably, the updraft of air 7 created by the system may be used to generate electricity with the use of wind turbines 8 positioned within the tower if or within the air intake 2 to the glass roof 16, within the glass roof 16 itself and/or to the exhaust of the tower if. Also, a combination of all of the above mentioned positions may also be incorporated.

Preferably computer or manually regulated transparent louvres, flaps, or other wind directing devices 59 to façade 14f of helix cavity 57 may direct wind air flow 58 into the helix type façade cavity 57 in such a way as to force air to flow in an downward flowing spiral type motion 7d.

This same air flow 7d may be used to ventilate the habitable areas 13 of the tower if as well as being used for the ventilation of the space 18 under the glass roof 16 and for the ventilation of tunnel 45 or for any other useful and appropriate purpose including power generation.

As per other forms of this present invention, the central shaft 11 may be used as a hot air chimney into which heat energy may be transferred from air conditioning systems 4 as well as from other appropriate heat sources and this transference of heat into the Biotower will help alleviate the problems associated with the so called heat island effect as well as generate electricity via the use of turbines 8. The updraft created within shaft 11 may preferably be combined with the upward movement of air created within spiral cavity 56 to drive turbines 8. The air heated by solar radiation within the glass roof 16 between member 14g and 15g may preferably be used to augment the updraft of air 7 within with shaft 11 and/or spiral cavity 56 and therefore increase the capacity of the Biotower to generate electricity and/or ventilate spaces and areas.

Habitable spaces 13 including commercial, residential real estate may be incorporated in this current form of the invention and are located between the central shaft 11 and the double helix envelope 55. Light would preferably pass through the helix envelope 55 into the habitable spaces 13 as cladding 14f and 11f are preferably transparent.

If appropriate landscaping may be incorporated into spiral cavity 57 with public access allowed. Down flowing air would be purified by the vegetation within.

The space 18 under the glass roof 16 would preferably be landscaped. The glass roof 16 may be built over a park to provide all weather access and the air from the downward flowing spiral cavity would introduce clean air into city centres.

A similar form of this current invention consists of a singe helix structure, which would direct air in either an upward spiral motion or in a downward spiral motion; normally, in an upward spiral for use in power generation and urban ventilation.

Figure 13:
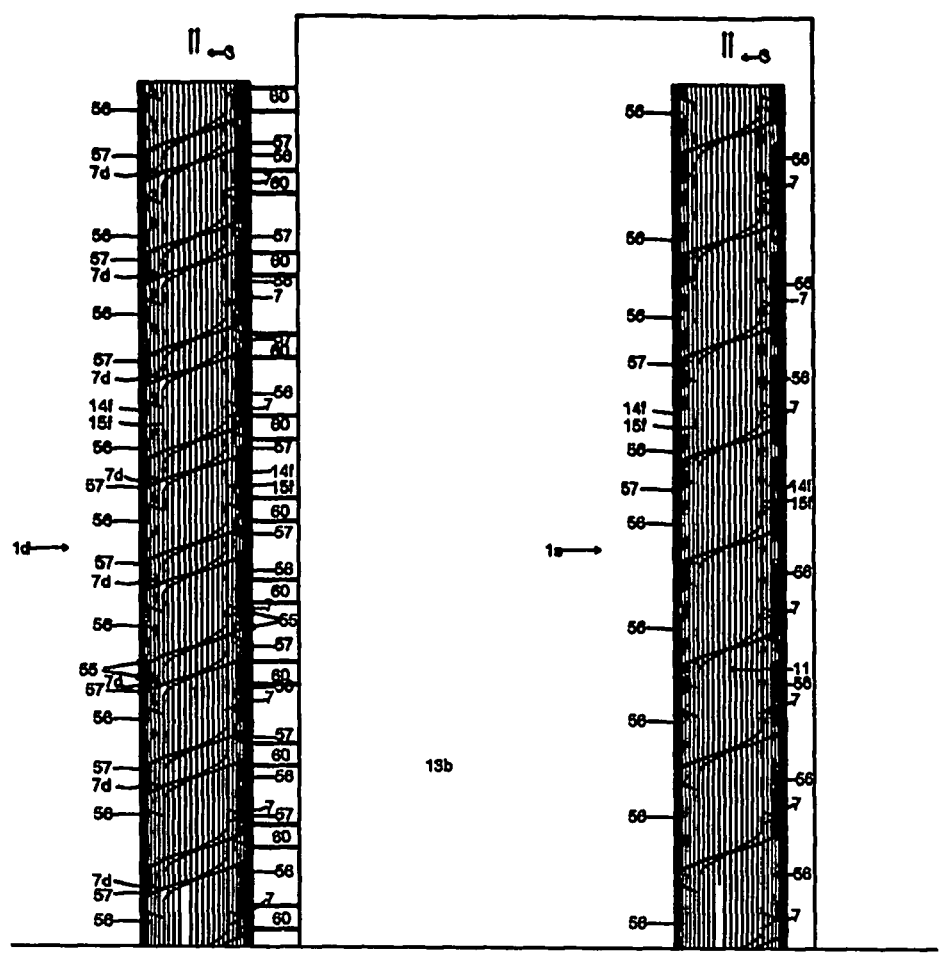
FIG. 13 shows a schematic elevation of an embodiment of a Biotower according to this invention.

FIG. 13 shows a schematic elevation indicating an example of a Biotower according to this invention. The various functions described on FIG. 9 of this invention and other examples of this invention may be incorporated in this example of the invention.

Figure 14:
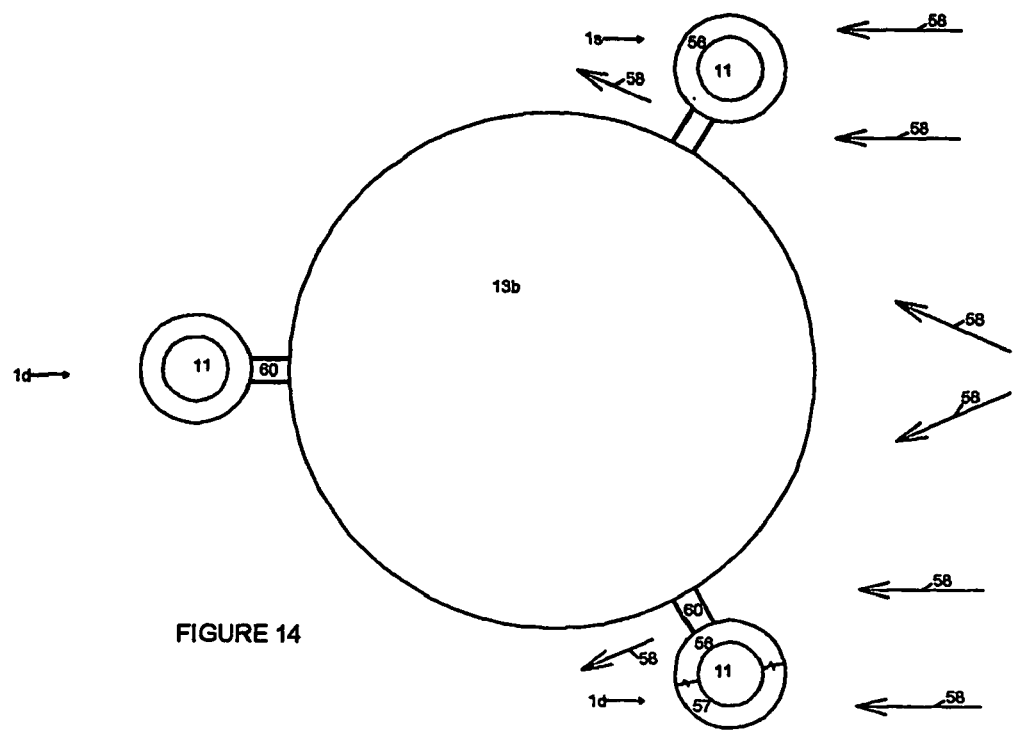
FIG. 14 shows in plan view the same example of a Biotower according to that depicted in FIG. 13

FIG. 14 shows in plan view the same example of a Biotower according to this invention depicted in FIG. 13.

Referring to FIG. 13 and FIG. 14 it can be seen that the Biotower according to this invention comprises and double helix envelope 55 tower 1d and a single helix envelope 56 tower is as attachments to another structure 13b.

The double helix envelope 55 wind pump towers 1d and the single helix envelope 56 tower 1s is used in combination with a large building 13b to concentrate the wind 58 as it flows past the helix towers 1d and 1s.

The spiral cavities 57, as well as directing wind 58 in a downward flowing spiral 7d may also be used as a spiral staircase for multi storey buildings and/or for ventilation purposes and/or for power generation. Lifts may also be incorporated within the central shaft 11 of the helix towers 1d and 1s. A stack may be included within the central shaft 11 of the helix towers 1b and is to contain an updraft of air for the purpose of utilizing the heat from air-conditioning systems from nearby buildings and to drive electricity generating turbines.

The spiral cavities 56 in towers 1s and 1d, as well as directing wind 58 in a upward flowing spiral 7 may be used for ventilation purposes and/or for power generation.

Connecting structures 60 connect helix towers 1b and 1s to main structure 13b and may be used as foot bridges to connect to staircase(s) within cavity 57 to the main structure 13b and/or for ventilation ducts and other services and functions.

Figure 15:
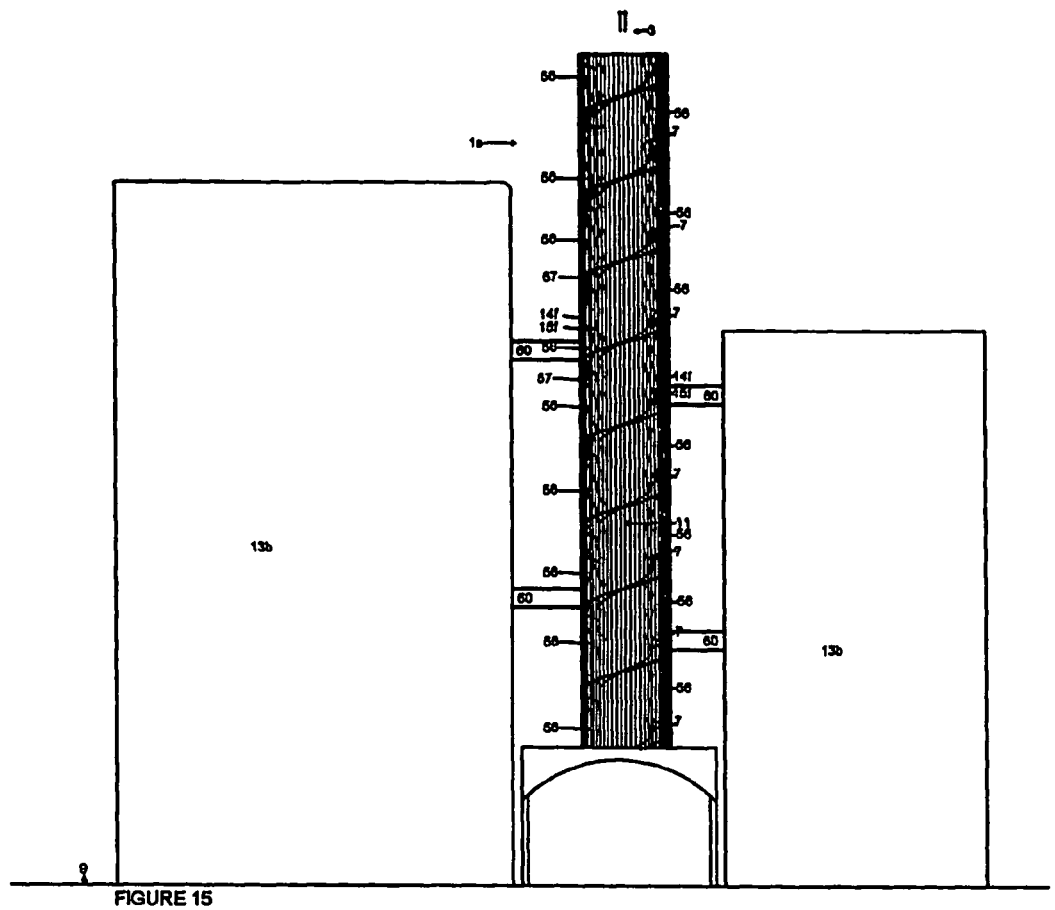
FIG. 15 shows a schematic elevation indicating an alternative embodiment of a Bio-tower

FIG. 15 shows a schematic elevation indicating an example of a Bio-tower according to this invention.

Figure 16:
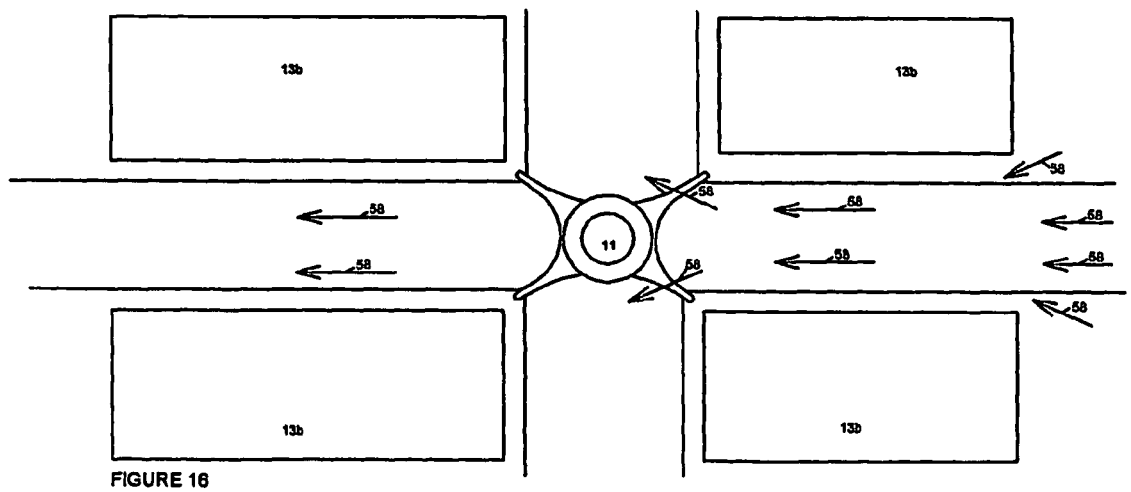
FIG. 16 shows in plan view the example of a Biotower according to this invention depicted in FIG. 15.

FIG. 16 shows in plan view the same example of a Biotower according to this invention depicted in FIG. 15.

Referring to FIG. 13 and FIG. 14 it can be seen that the Biotower according to this invention comprises a single helix type envelope 56 tower 1s an attachment to another structures 13b. This example of the invention is similar in many aspects to the example of helix tower 1s shown in FIG. 13 and FIG. 14, with the exception that it is connected to many buildings and is shown suspended above street level 9. As described in other examples of this current invention, the tower 1s may be used to generate electricity and provide urban ventilation. When connected to air-conditioning systems of nearby buildings, with heat transport/circulation mechanisms, the heat may be released into the central shaft 11 and used to drive electricity generating turbines. When tower 1s does not incorporate a central shaft 11 the said heat from air-conditioning systems may be released into spiral cavity 56 and augment the upward flow of air produced by the prevailing wind and may also provide a convection current within cavity 56 when there is little or not prevailing wind acting upon the tower.

The connecting structures 60 may be used to carry mechanical services and, if required, may be a means of egress as the tower 1s may also be used as a means of egress. Prevailing wind 58 is forced to travel between existing buildings 13b thereby increasing its velocity. The tower 1s may take advantage of this concentrated wind flow by directing it into an upward flowing spiral draft within the tower 1s.

Towers 1s and 1b with or without central shafts 11 may be utilized in with existing structures and topography especially where wind patterns augment the functioning of the said towers. New structures may be designed to be used with the towers 1s and 1b to direct wind currents in suitable ways in order to augment the functioning of the towers 1s and 1b and to improve the amenity of the flora and fauna that use the surrounding environs.

Figure 17:
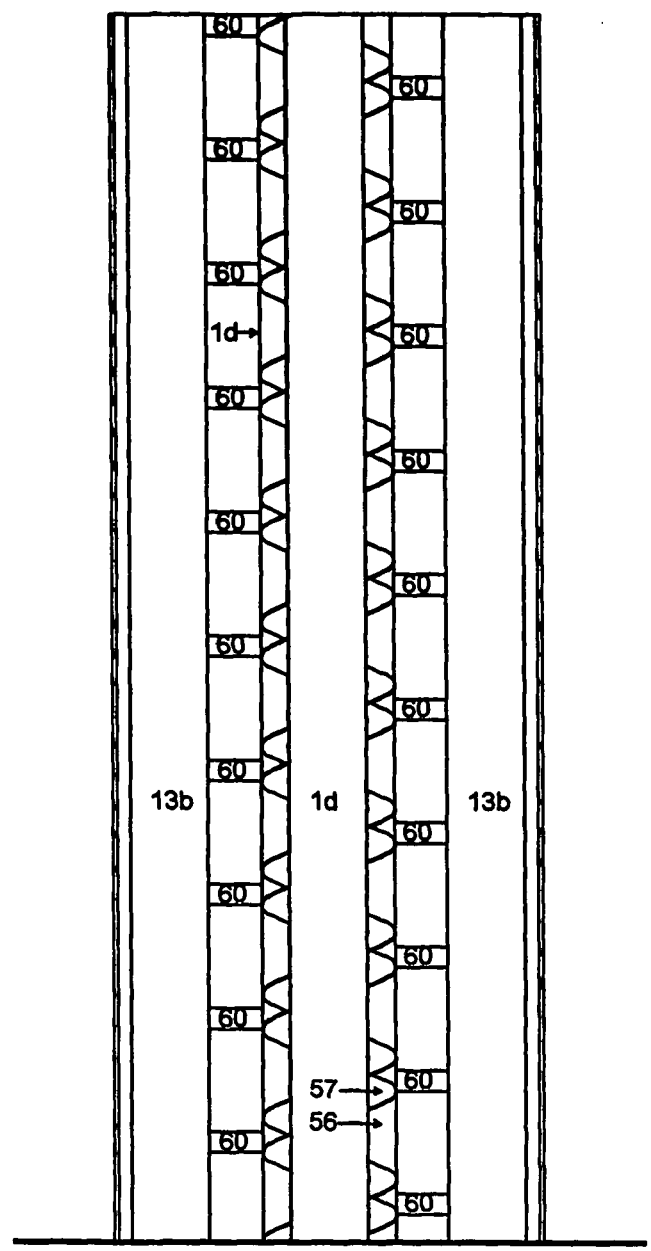
FIG. 17 shows a schematic elevation indicating an example of a Biotower according to this invention.

FIG. 17 shows a schematic elevation indicating an example of a Biotower according to this invention.

Figure 18:
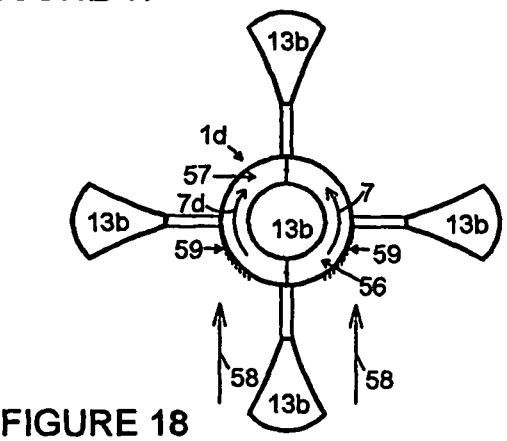
FIG. 18 shows in plan view the same example of a Biotower according to the embodiment of the invention depicted in FIG. 17.

FIG. 18 shows in plan view the same example of a Biotower according to this invention depicted in FIG. 17. The numbers used are as per previous examples of the current invention.

Referring to FIG. 17 and FIG. 18 it can be seen that the Biotower according to this invention comprises a double helix type envelope 55 tower 1d with four wings on four sides of the tower 1d comprising habitable structures 13b. The center of the tower 1d is habitable 13b. The four said wings act to direct prevailing wind 58 towards the tower 1d in order to increase the wind velocity close to the tower 1d. In this way habitable structures may be designed as part of the biotower in order to augment its functionality especially related to the generation of electricity, the ventilation of urban spaces and the passive ventilation of the habitable areas 13b of the structure itself.

Figure 19:
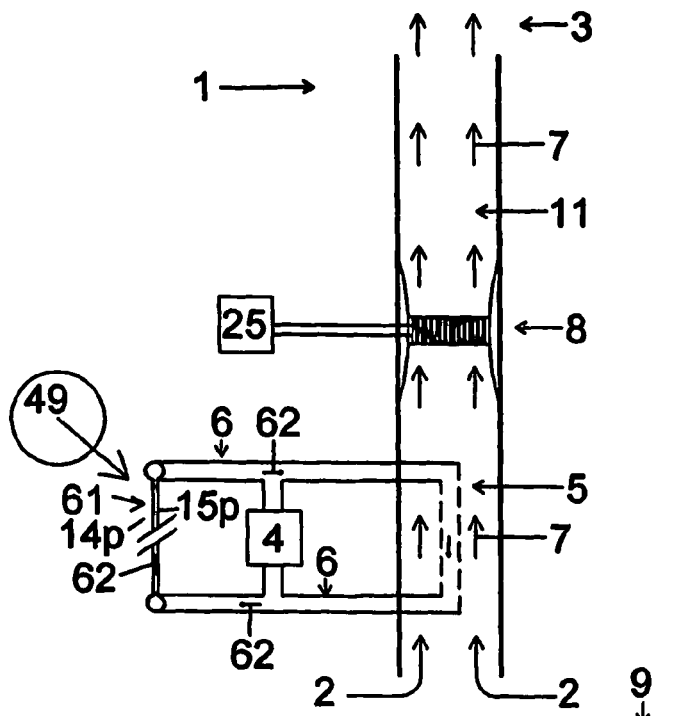
FIG. 19 shows a schematic cross section indicating a form of Biotower according to one embodiment of the invention.

FIG. 19 shows a schematic cross section indicating a form of Biotower according to this invention.

Referring to FIG. 19 it can be seen that the plasma glazing according to this invention comprises a chimney 1 containing a convection current 7 driving turbine 8 within shaft 11 producing electricity 25 via a generator driven by the same turbine. Heat from air-conditioning systems 4 and from solar radiation 49 captured by plasma glazing system 61 is transferred to air in shaft 11 via heat transport/circulation mechanism 6 (normally water pipes) in order to create said convection current 7.

The so-called plasma glazing 61 filters heat from the sun and allows light to pass through normally to illuminate interiors of buildings or to provide a transparent divider such as a balustrade. Plasma glazing 61 comprises a transparent outer layer 14p, which allows heat and light from the sun to pass through and prevents much of the heat within from passing back out. Inner transparent layer 15p allows light to pass through and reflects as much radiant heat as possible in order to trap the same heat between the two transparent layers 14p and 15p between which water or another heat or energy carrying medium 62 may be passed. In this way heat may be captured and transported to heat exchange mechanism 5 with the use of plasma glazing which preferably appears as normal glazing.

Figure 20:
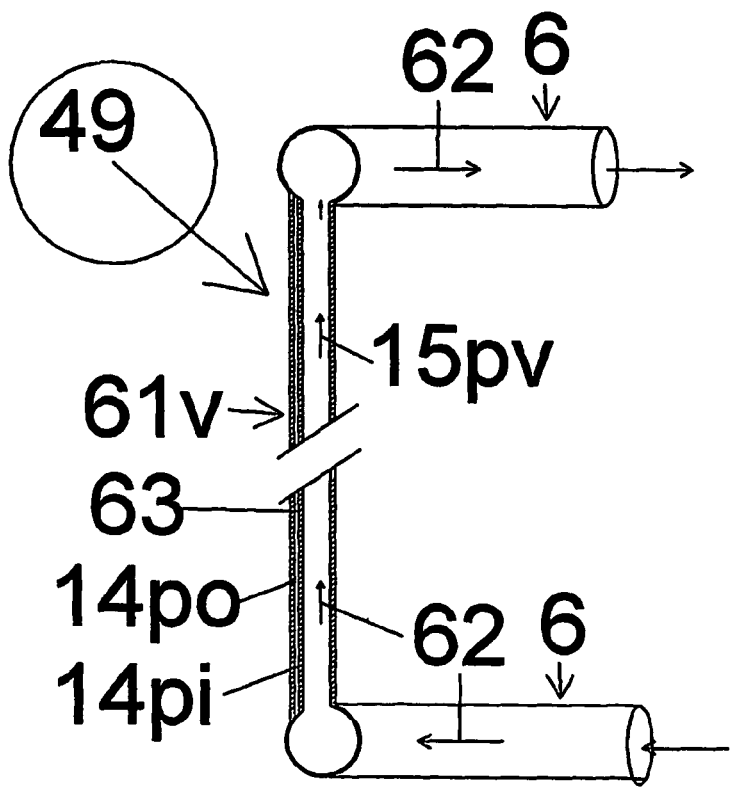
FIG. 20 shows a schematic cross section indicating a form of insulated plasma glazing.

FIG. 20 shows a schematic cross section indicating a form of insulated plasma glazing 61v according to this invention.

Referring to FIG. 20 it can be seen that the insulated plasma glazing 61v according to this invention comprises three transparent or semi transparent members 14po 14i and 15pv, which are normally mounted in a parallel configuration relative to each other. Transparent member 14po and 14pi are separated by a vacuum or a transparent insulating substance such a gas or a combination of gases. Member 14pi and 15pv are separated by a cavity through which a heat carrying medium 62 may be passed such as water which is circulated to the biotower via transport mechanism 6. The insulation cavity 63 augments the retention of heat within the plasma glazing. Transparent member 14pi preferably has the ability to absorb heat as solar radiation passes through it (such as tinted glass). This heat is preferably transferred to the heat carrying medium 62 and the insulating cavity 63 minimizes heat loss into the outside atmosphere which important when the insulated plasma glazing 61v is used as glazing in windows and other fenestrations. Insulation cavities 63 may be used on either side of the insulated plasma glazing 61v and multiple insulation cavities 63 may be used on either side of the insulated plasma glazing if required. Said plasma glazing may preferably be used as cladding to the said glass roof 16 of this invention or as external cladding in general for the various forms of this invention.

FIG. 21 shows a schematic cross section indicating a form of plasma glazing 61b according to this invention.

FIG. 22 shows a schematic elevation indicating a form of plasma glazing 61b according to this invention viewed facing the transparent member 14p.

Referring to FIG. 21 it can be seen that the plasma glazing 61b according to this invention comprises two transparent members 14p and 15p separated by a cavity through which microbe carrying transparent fluid 62m may flow. Internal preferably transparent divisions 641 direct the flow of fluid 62m and gas 65 within the said cavity. Microbe carrying transparent fluid 62m is circulated through the cavity via transport mechanism 6 (normally pipe work).

Referring to FIG. 22 it can be seen that the plasma glazing 61b according to this invention comprises transparent member 14p separated from transparent member 15p (shown FIG. 21) with dividing members 64 and 641. Microbe carrying transparent fluid 62m is pumped or otherwise made to flow via transport/circulation mechanism 6 into said cavity and may reach a maximum height 62mh within the cavity before flowing over the top of the lowest internal divider 64i before being discharged (as indicated by 62mo) from the plasma glazing 61b into transport/circulation mechanism 6. Preferably the microbe carrying fluid 62m contains photosynthetic compounds for the production of hydrogen gas 65 or other fuel, which may be directed out of the cavity with the use of internal partition 64i and perimeter partition 64 and thus create a fluid free passage for the flow of hydrogen or other gas 65. The same hydrogen gas 65 is preferably used to fuel said fuel cells incorporated with the biotower or for other useful purposes. The transparent members 14p and 15p may also act to trap radiant heat as per examples described in FIGS. 19 and 20 in order to maintain the optimum operating temperature for the operation of photosynthetic and other processes and this said operating temperature may be regulated by circulating the said microbe carrying medium 62m to the biotower wherein excess heat may be released from the same medium 62m In so doing further augment the functionality of the biotower.

The example shown in FIG. 22 is useful if no framing is required to the top and sides of the plasma glazing and the transparent members 14p and 15p are self-supporting, which is especially useful when the plasma glazing is required for a frameless glass balustrade, fixed at the bottom edge only. If pipe work or other transport circulation mechanism 6 is available to the top and bottom of the plasma glazing 61b, internal partitions 64i may not be needed.

FIG. 23 shows a schematic cross section indicating a form of plasma glazing 61p according to this invention, which may be used as an architectural feature such as a reflection pond or water feature.

Referring to FIG. 23 it can be seen that the plasma glazing 61p according to this invention comprises transparent member 14t separated from microbe carrying transparent fluid 62m by a layer of hydrogen or other gas 65.

This form of the invention is a solar radiation collector designed to expose a carrier medium 62m such as water or a water based synthetic complex to solar radiation 49 within one or more layers of glass or other preferably transparent or semi opaque member 14t the said carrier medium 62m preferably contains man-made compounds able to utilize solar energy and to use it to produce hydrogen from water through a process of artificial photosynthesis. This said artificial photosynthesis for hydrogen production from sunlight and water by direct photochemistry in synthetic complexes 62m preferably should produce hydrogen (or other fuels) from solar energy and water. The heat trapped in the said carrier medium 62m, due to its exposure to said solar radiation, may then be circulated or transported to the biotower other devices via pipes or ducts or the like, which may extract the same heat and use it for useful purposes; the said solar radiation collector 61p should preferably be useable as an architectural element such as a pond or water feature. The hydrogen 65 or other useful substance produced via this said process of artificial photosynthesis or by natural photosynthesis should preferably be captured by the said solar radiation collector 61p and piped or otherwise transported away 65 for use for use in the biotower fuel cells 26 (FIG. 9) or for other useful purposes.

FIG. 24 shows a schematic cross section indicating a form of plasma glazing 61a according to this invention, incorporated into an awning structure, which may be used as an architectural device to provide shelter to pedestrians. It comprises support structure 48, transparent cover in the form of plasma glazing 61a and is connected to a building 13b with plasma glazing 61 to its façade.

Referring to FIG. 24 it can be seen that the plasma glazing 61a according to this invention is used to provide shelter over urban footpaths 9f whilst still allowing sunlight to pass through. Preferably much of the ultra violet light and heat from the sun's rays 49 will be captured by the plasma glazing 61a for use in the biotower.

The awning structure 48 may also be utilized to support pipe work for heat transport/circulation mechanism 6 that circulates hot water 62 (or other energy carrying medium) from air conditioning systems 4 and other energy sources to the biotower. Any form of plasma glazing according to this invention may be used as an awning cover, walkway covering, and etcetera.

Preferably the plasma glazing using artificial photosynthesis for hydrogen production from sunlight and water by direct photochemistry in synthetic complexes 62m will produce hydrogen gas 65 for use in fuel cells 26 (FIG. 9) as part of the biotower system. Preferably excess heat captured by the same synthetic complex type carrier medium 62m will be used to augment the biotower system via an appropriate heat transport/circulation and transfer mechanisms and in order to optimise temperature levels in the plasma glazing for the production of hydrogen 26 or alternate fuel.

The said synthetic complex type carrier medium 62m will be maintained at a maximum height 62mh above which hydrogen will collect for transport to tower via pipe 65.

Preferably rainwater will be collected by roof gutter 68 and drained into downpipe 67 and used to replenish water converted to hydrogen 65 and/or other fuels by the said plasma glazing system or for use by other parts of the biotower system.

FIG. 25 shows a schematic cross section indicating a form of awning structure utilizing double-glazing according to this invention. It comprises support structure 48, transparent cover in the form of double-glazing 14p and 15p and is connected to a building 13b with a roof garden 70.

Referring to FIG. 25 it can be seen that the double-glazing 73 according to this invention is used to provide shelter over urban footpaths 9f whilst still allowing sunlight to pass through. Preferably much of the ultra violet light and heat from the sun's rays 49 will be captured by the double glazing 73 for use in the biotower. The awning structure 48 may also be utilized to support pipe work for heat transport/circulation mechanism 6 that circulates hot water 62 (or other energy carrying medium) from air conditioning systems 4 and other energy sources to the biotower as for the form of the invention described in FIG. 24.

Water draining through the soil on the roof garden may preferably be reused in other parts of the system or connected to the rain water system. When appropriate, grey water from the building or from the biotower wastewater treatment system 29 may be fed into the soil 69 in order to irrigate roof gardens and further purify the water. After irrigation, the same water may drain via drainage system 74 into the water gutters 68a running the length of the awnings 73. As this water flows it will be exposed to the sun's radiation 49 and if conditions are appropriate, algae that is suitable for the promotion of methane production in preferably anaerobic digesters 28 may be employed if the biotower incorporates such methane producing sewerage treatment system 28.

Preferably the water with algae draining from the bio awnings should be added to the digesters only at the appropriate temperature to augment the production of the biogas (including methane). Preferably, the water with algae may be separated from the water and added to the system in order to augment the production of the biogas if the water temperature is not suitable.

FIG. 26 shows a schematic cross section indicating a form of heat absorption system according to this invention.

Referring to FIG. 26 it can be seen that the road surface heat transfer system 75 according to this invention comprises a series of pipes positioned below the surface of the road 9r through which heat carrier medium 62 such as water may be circulated to heat carrier medium transport/circulation mechanism 6 such as water pipes which circulate the same medium 62 to the biotower.

The heat carrying medium 62 is heated by solar radiation 49 absorbed from roadways 9r and other hard surfaces and is preferably used as a heat source to augment the functioning of the bio tower. After the same heat carrying medium 62 has transferred its latent heat to the biotower it is re-circulated to the hard surface heat transfer system 75 to be reheated.

FIG. 27 shows a schematic cross section indicating a form of heat absorption system according to this invention, which is added to the exterior of an existing surface such as a roadway 9r.

Referring to FIG. 27 it can be seen that the surface heat transfer system 75 according to this invention comprises a series of pipes positioned below the surface of the road 9r through which heat carrying medium 62 such as water may be circulated to heat carrying medium transport circulation mechanism 6 such as water pipes which circulate the same medium 62 to the biotower. The heat carrying medium 62 is heated by solar radiation 49 absorbed from roadways 9r and other hard surfaces and is preferably used as a heat source to augment the functioning of the bio tower. After the same heat carrying medium 62 has transferred its latent heat to the biotower it is re-circulated to the hard surface heat transfer system 75 to be reheated.

The present invention has been described in this document with reference to particular embodiments only. It will be understood by persons skilled in the art, that numerous variations and modifications can be made to the invention. All such variations and modifications should be considered to be within the scope of the invention, broadly described within this document.

The invention claimed is:

1. An energy generating power plant for integration with a high rise building and which is capable of energizing at least one power generating device, and receiving atmospheric wind energy from a first location and capturing the energy for transfer to another location to augment energy requirements of the building; the plant comprising:
   a stack integrated with the building and having a base and at least one inlet and at least one outlet;
   the at least one inlet leading to at least one through passage in the stack which each receive air drawn from an air source exterior of the building;
   the air source generating an air stream upon entry into said at least one inlet thereby moving the air stream from the first location to said other location via a formation generating a vortex;
   the at least one passage in the stack communicating between said at least one inlet and said at least one outlet and which each receive the air stream drawn from the air source;
   the stream of air moving within the passage under the energy generated by said wind energy; the energy from the moving air stream being usable to energize an energy receiving device within the building for conversion or diversion of the energy; and
   the formation comprising at least one helix extending longitudinally along the stack.

2. An energy generating power plant according to claim 1 wherein the helix formation includes first and second helical sections.

3. A power plant according to claim 2 wherein the first and second helix sections respectively define first and second helix passages.

4. A power plant according to claim 3 wherein the first and second helix passages are separated from each other by a valve assembly which selectively allows air communication between said first and second passages.

5. A power plant according to claim 4 wherein, the helix formations also incorporate a stairway.

6. A power plant according to claim 5 wherein the stack is used to transfer air from surrounding city structures.

7. A power plant according to claim 6 wherein the power generating device provides power for at least one building.

8. A power plant according to claim 7 wherein the atmospheric wind contributes to a vortex updraft in the helix formations.

9. A power plant according to claim 8 wherein the building further comprises a cladding defining at least one internal space between an outer surface of the cladding and an outer surface of the building.

10. A power plant according to claim 9 wherein air in said at least one internal space is heated by solar power.

11. A power plant according to claim 10 wherein the cladding comprises at least one layer of glass which allows solar radiation to pass therethrough, thereby heating the air in the at least one space which supplements air drawn into said stack from the atmosphere.

12. A power plant according to claim 11 wherein the at least one space is capable of receiving water for heating by solar power.

13. A power plant according to claim 12 wherein heated air rising in said helix spiral is supplemented by air heated in said space between the cladding and said building.

14. A power plant according to claim 13 wherein, the at least one space includes solar radiation collectors.

15. A power plant according to claim 14 wherein each solar radiation collector includes at least one air passage which receive thermal energy from a heating source to supplement heating of air drawn into the building.

16. A power plant according to claim 15 wherein condensate from said cladding surfaces is collected by a pipe network for use as a water supply.

17. A power plant according to claim 16 wherein said heating source is provided by waste heat of air conditioning systems from nearby structures.

18. A power plant according to claim 16 wherein said heating source is provided by water circulated in glazing systems.

19. A power plant according to claim 17 wherein said heating source is provided by heat absorbed by hard surfaces.

20. A power plant according to claim 17 wherein said heating source is provided by heat trapped by glass roofs.

21. A power plant according to claim 17 wherein said heating source is provided by piped hot water.

22. A power plant according to claim 17 wherein the stack is inside the building.

23. A power plant according to claim 17 wherein the stack is located outside the building.

24. A power plant according to claim 23 wherein a baffle channels said air along passages in said stack to generate an air spiral.

25. An energy generating power plant for integration with a high rise building and which is capable of energizing at least one power generating device, and receiving atmospheric wind energy from a first location and capturing the energy for transfer to another location to augment energy requirements of the building; the plant comprising:
- a stack integrated with the building and having a base and at least one inlet and at least one outlet;
- the at least one inlet leading to at least one through passage in the stack which each receive air drawn from an air source exterior of the building;
- the air source generating an air stream upon entry into said at least one inlet thereby moving the air stream from the first location to said other location via a formation generating a vortex;
- the at least one passage in the stack communicating between said at least one inlet and said at least one outlet and which each receive the air stream drawn from the air source;
- the stream of air moving within the passage under the energy generated by said wind energy; the energy from the moving air stream being usable to energize an energy receiving device within the building for conversion or diversion of the energy; and
- the formation comprising at least one helix extending longitudinally along the stack, wherein a baffle channels said air along passages in said stack to generate an air spiral, and wherein said baffle is computer controlled and the inlets to the stack include adjustable louvers.

* * * * *